(12) United States Patent
Gardner et al.

(10) Patent No.: US 10,794,534 B2
(45) Date of Patent: Oct. 6, 2020

(54) FILL TUBE

(71) Applicant: Cutting Edge Tool Supply, Inc., Colorado Springs, CO (US)

(72) Inventors: Kevin C Gardner, Chase Point, CO (US); Leo Edward Sadzewicz, La Mesa, NM (US)

(*) Notice: Subject to any disclaimer, the term of this patent is extended or adjusted under 35 U.S.C. 154(b) by 556 days.

(21) Appl. No.: 15/640,547

(22) Filed: Jul. 2, 2017

(65) Prior Publication Data
US 2019/0003641 A1   Jan. 3, 2019

(51) Int. Cl.
| F16N 21/00 | (2006.01) |
| F16N 19/00 | (2006.01) |
| F01M 11/04 | (2006.01) |

(52) U.S. Cl.
CPC ......... F16N 21/00 (2013.01); F01M 11/0458 (2013.01); F16N 19/00 (2013.01); *F16N 2210/04* (2013.01)

(58) Field of Classification Search
CPC ...... F16N 21/00; F16N 19/00; F01M 11/0458
USPC ...................................................... 184/105.1
See application file for complete search history.

(56) References Cited

U.S. PATENT DOCUMENTS

| 2,420,668 | A | * | 5/1947 | Knight | ................ | F42B 33/0228 |
| | | | | | | 86/33 |
| 3,835,272 | A | * | 9/1974 | Wisenbaker | ............ | F21V 23/04 |
| | | | | | | 200/60 |
| 4,703,867 | A | * | 11/1987 | Schoenhard | ........... | F01M 11/04 |
| | | | | | | 141/331 |
| 4,896,746 | A | * | 1/1990 | Desjardins | ............. | F01M 11/04 |
| | | | | | | 123/196 R |
| 5,158,123 | A | * | 10/1992 | Senko | ..................... | B67C 11/02 |
| | | | | | | 141/338 |
| 5,242,075 | A | * | 9/1993 | Ott | ..................... | B60K 15/0406 |
| | | | | | | 184/105.1 |
| 5,249,556 | A | * | 10/1993 | Emmitt | .................... | F01M 1/16 |
| | | | | | | 123/196 CP |
| 5,316,059 | A | * | 5/1994 | Lahnan | .................. | B67C 11/02 |
| | | | | | | 141/331 |
| 5,389,253 | A | * | 2/1995 | Cicconi | ................ | B01D 29/085 |
| | | | | | | 210/248 |
| 5,402,835 | A | * | 4/1995 | Middleton | .............. | B67C 11/00 |
| | | | | | | 141/331 |
| 5,535,793 | A | * | 7/1996 | Tantre | .................... | B67C 11/02 |
| | | | | | | 141/331 |
| 5,634,502 | A | * | 6/1997 | Pierce | .................... | F01M 11/04 |
| | | | | | | 141/331 |
| 7,823,697 | B2 | * | 11/2010 | Nishiwaki | ............. | F16C 13/006 |
| | | | | | | 184/105.3 |
| 2006/0000315 | A1 | * | 1/2006 | Patterson | ........... | B25B 27/0028 |
| | | | | | | 81/8.1 |

\* cited by examiner

*Primary Examiner* — Michael R Mansen
*Assistant Examiner* — Mark K Buse
(74) *Attorney, Agent, or Firm* — Siddhartha Kamisetti, Esq

(57) ABSTRACT

The subject matter described herein includes a fill tube apparatus's and methods of manufacturing a fill tube apparatus. The fill tube can include an inner tube funnel element comprising an inner wall portion, a mouth opening portion, a hollow shaft portion, a hollow stem portion, and a stem opening portion. Furthermore, the fill tube can include an outer tube element comprising an outer wall portion comprising a base portion, a grip portion, a valley portion, and a threaded stem portion.

12 Claims, 14 Drawing Sheets

FILL TUBE

TECHNICAL FIELD

This disclosure relates generally to a fill tube apparatus and methods of manufacturing a fill tube apparatus.

BACKGROUND

At least some known vehicles such as motorcycles, all-terrain vehicles (ATV's), utility task vehicles (UTV's), and other such vehicles include oil tanks. When filling oil into an oil tank of a vehicle many problems can arise such as debris entering into the oil tank, filling the oil tank above an optimal capacity, spilling and/or splattering oil on unintended parts of the vehicle when attempting to pour into an oil tank opening. All of these issues are prevalent when filling up a vehicle oil tank with oil. As such there is a need for an apparatus and system to help overcome these problems and numerous inefficiencies associated with filling a vehicle oil tank with oil or any other material.

SUMMARY

The following presents a simplified summary of the disclosure in order to provide a basic understanding of some aspects of the disclosure. This summary is not an extensive of the disclosure. It is intended to neither identify key or critical elements of the disclosure nor delineate any scope of the particular aspects of the disclosure, or any scope of the claims. Its sole purpose is to present some concepts of the specification in a simplified form as a prelude to the more detailed description that is presented in this disclosure.

In accordance with an aspect, an apparatus is disclosed comprising an inner tube funnel element comprising an inner wall portion, a mouth opening portion, a hollow shaft portion, a hollow stem portion, and a stem opening portion. In an aspect, the apparatus also comprises an outer tube element comprising an outer wall portion comprising a base portion, a grip portion, a valley portion, and a threaded stem portion. In yet another aspect, the apparatus can also comprise an O-ring element that rests on a first surface of the fifth sloped cylindrical portion and circumscribes one or more thread of the external thread portion, and wherein the O-ring element is capable of sealing a linkage between the external thread portion and an internal an internal thread portion that circumscribes a containment opening of a containment portion.

In another aspect, disclosed is a method of manufacturing a fill tube apparatus comprising machining an inner tube funnel element comprising a mouth opening portion, a hollow shaft portion, and a stem opening portion. The method also includes, machining an outer tube element comprising an outer wall portion and an inner wall portion, wherein the outer wall portion comprises a base portion, a grip portion, a valley portion base portion, and a threaded stem portion. In yet another aspect, the method can further comprise removing layers of the one or more material using removal processes selected from the group consisting of cutting, tapping, tooling, drilling, chamfering, abrading, forming, grinding, shaping and knurling.

In accordance with another aspect, disclosed is an interlocked oil fill tube and oil storage tank assembly comprising an outer tube element comprising an outer wall portion and an inner wall portion, wherein the outer wall portion comprises a base portion, a grip portion, a valley portion, and a threaded stem portion. Furthermore, in an aspect, the interlocked oil fill tube and oil storage tank assembly can include an oil storage tank interlocked to the outer tube element via a linkage of the threaded stem portion to an internal thread portion circumscribing an opening of the oil storage tank.

The following description and the annexed drawings set forth in detail certain illustrative aspects of this disclosure. These aspects are indicative, however, of but a few of the various ways in which the principles of this disclosure may be employed. This disclosure intended to include all such aspects and their equivalents. Other advantages and distinctive features of this disclosure will become apparent from the following detailed description of this disclosure when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

The illustrated figures are not drawn to scale. Whenever possible, the same reference numeral will be used throughout the drawing(s) and accompanying written description to refer to the same or like parts.

DETAILED DESCRIPTION

Figure 1A:
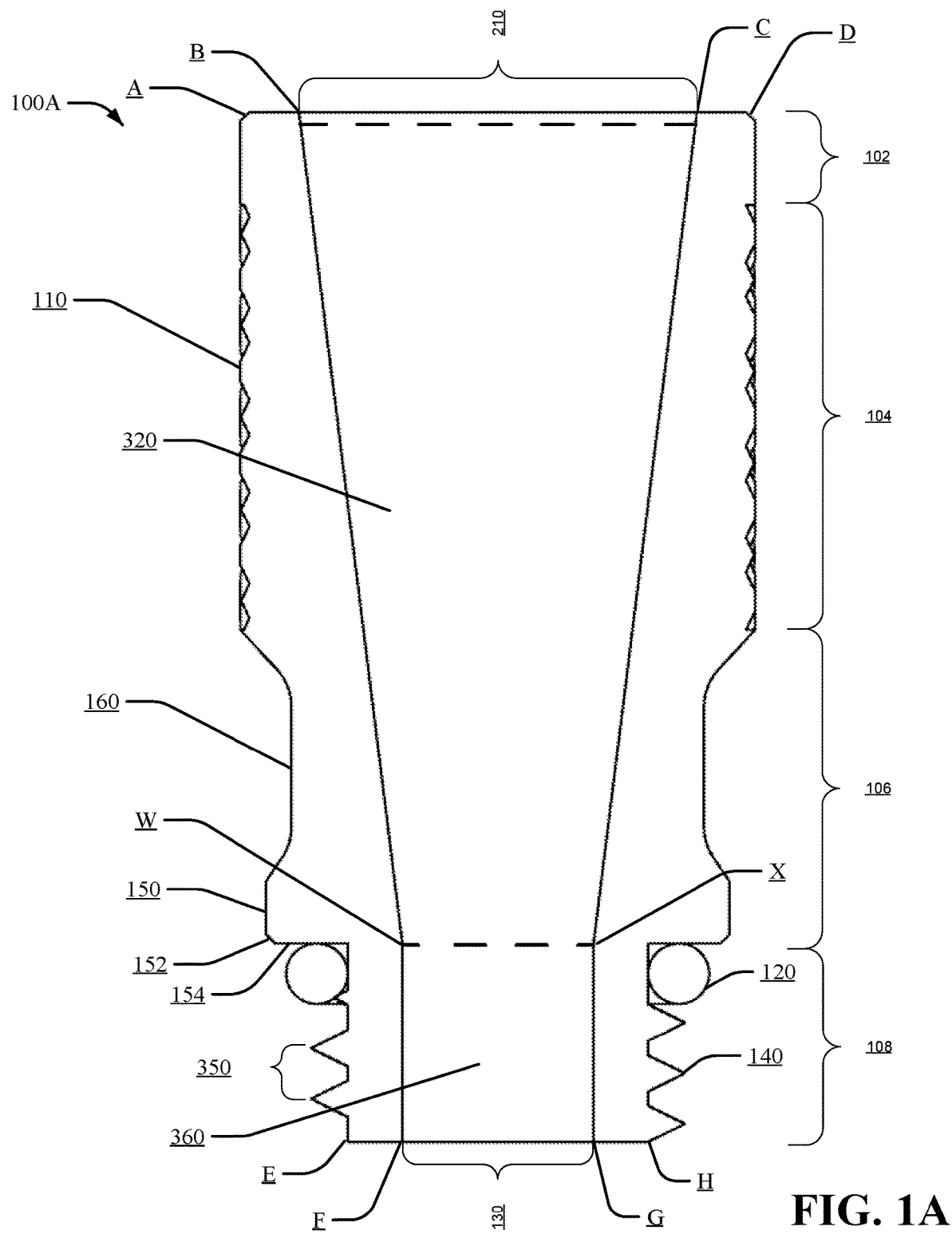
FIG. 1A illustrates a non-limiting example of a longitudinal cross-section perspective view of an oil fill tube apparatus configured to facilitate an efficient transmission of oil to a vehicle oil tank component in accordance with one or more embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject disclosure is related to apparatuses and methods for facilitating an efficient transmission of oil into a vehicle oil tank. The process of filling an oil tank with oil can be a troublesome and messy process. Often times, the oil tank on a vehicle is embedded between vehicle components that block free and clear access to an oil tank opening. As such, pouring oil into the oil tank can be hindered by obstructing vehicle component parts. This can lead to oil spilling on several unintended vehicle components surrounding the oil tank opening due to troublesome access to the oil tank in the midst of other obstructing component parts. Furthermore, a user is often so consumed with adjusting positions of an oil canister to accurately pour the oil into the tank opening that the user loses focus on pouring an adequate amount of oil into the oil tank either leading to filling the oil tank above capacity. Furthermore, even in instances where a vehicle oil tank may be accessible, it is difficult to accurately pour oil into the oil tank opening without missing, spilling, or overflowing (pouring over the capacity of the vehicle oil tank) the oil outside of the tank.

In another aspect, the opening to a vehicle oil tank is often small and requires perfect accuracy to successfully pour oil from an oil container (e.g., canister) into the small opening. Furthermore, if the user pouring the oil into the oil tank loses steadiness or is not careful, the oil can splatter or miss the opening and hit other vehicle components thus creating a mess. Also, a user attempting to pour oil into the vehicle oil tank often has been working on other aspects of the vehicle and may have lubricant, oil or other liquid on its hands thus adding to the difficulty of maintaining a firm grip on the oil canister and making an accurate pour into the small oil tank opening. Accordingly, there are several nuisances associated with filling a vehicle oil tank with oil and in some instances harm can be done to the vehicle as a consequence of problems for pouring oil in the oil tank.

The oil fill tube apparatus disclosed herein overcomes the many issues associated with filling a vehicle oil tank or other vehicle containment component capable of storing a liquid or powder. In an aspect, disclosed herein is an an apparatus capable of interlocking with an opening of a vehicle oil tank (e.g., motorcycle oil tank) using a screw or fastener mechanism where the threading of a female portion within the oil tank opening is connected with an external thread portion of the apparatus. In an aspect, this interlocking mechanism provides a strong mechanism for integrating the fill tube apparatus and a vehicle oil tank as a monolithic continuous part.

In another aspect, the apparatus features a texturized pattern on the outer surface to facilitate a user grip on the fill tube. The textured pattern acts as a friction-inducing surface when in contact with a user hand to allow for a firm grip on the fill tube apparatus in order to easily tighten the apparatus (e.g., threading portion) to an oil tank opening. Furthermore, the firm grip can provide additional support to a user (e.g., providing a region of the apparatus to grasp) during a fill activity, in which the user can use one hand to grip the fill tube apparatus and another hand to pour oil from an oil canister into the fill tube apparatus leading into a chamber of the vehicle oil tank. In yet another aspect, the apparatus comprises an inner wall that circumscribes a cavity within the interior of the fill tube apparatus. The inner wall is shaped to form a hollow funnel cavity and a hollow stem cavity where there is a stem opening portion at the bottom of the hollow stem cavity and a mouth opening portion at the top of the funnel cavity.

In an aspect, the mouth opening portion has a wider diameter than the stem opening portion. Furthermore, the mouth opening portion is configured to receive oil or another liquid and/or powder, whereas the stem opening portion is configured to provide an exit opening (e.g., exit the apparatus and into a vehicle oil tank mouth) for the liquid and or powder. Also, in an aspect, the inner wall portion of the apparatus that forms the hollow funnel cavity, slopes inward such that an internal funnel is formed width a wider (e.g., largest opening diameter of the apparatus) mouth opening and more narrow at the stem opening portion thus channeling the liquid and/or powder into a focused stream.

Furthermore, in an aspect, the inner wall portion of the apparatus can have a smooth texture to enable a continuous flow of liquid (e.g., oil) and/or other material (e.g., powder) through the hollow funnel cavity and the hollow stem cavity and into a vehicle oil tank in a spill-free, continuous and low friction manner. Furthermore, gravitational forces act to further facilitate a quick and easy transmission of liquid (e.g., oil) from an oil holding mechanism (e.g., canister) and into the oil tank. Overall, the fill tube apparatus provides a useful and efficient tool for transmitting oil into an oil tank. Furthermore, the fill tube apparatus leaves no mess, such that all of the oil that passes through the fill tube enters into the oil tank and does not drip onto other vehicle components such as the exterior shell of the oil tank and surrounding components. In another aspect, an O-ring element can be inserted onto a part of the threading portion of the apparatus such that the apparatus is configured to form a tight seal with a surface of the oil tank opening. Furthermore, the O-ring element acts as an additional impenetrable feature of the apparatus to prevent any escape of oil or other liquid and/or powder from the interlocking interface between the apparatus and the oil tank opening.

In an embodiment, the fill tube apparatus also includes a set of crossed line indentations circumscribing an outer wall portion corresponding to a grip portion of the apparatus. In an aspect, the crossed line indentations are configured to facilitate a tight grasp of the apparatus and enable an easy screwing of the apparatus into an opening within a vehicle oil tank despite whether a user may have a slippery substance (e.g., oil, lubricant) on its hands. In another aspect, the set of crossed line indentations, facilitate malleable portions of a user hand (e.g., finger tissue) to press into grooves formed by the indentations and raised portions of the apparatus grip portion. Thus, a tight seal and/or grip can be formed between a user hand and the set of crossed line indentations.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures, apparatuses, and methods are shown in block diagram form in order to facilitate describing the embodiments.

While in some illustrations the various components are illustrated as separate components, it is noted that the various components can be comprised of one or more other components. Furthermore, it is noted that the embodiments can comprise additional components not shown for sake of brevity. Additionally, various components described herein may be assembled to form one apparatus.

Referring now to FIG. 1A, illustrated is a non-limiting example of a longitudinal cross-section perspective view of an oil fill tube apparatus 100A configured to facilitate an efficient transmission of oil to a vehicle oil tank component in accordance with one or more embodiments described herein. In a non-limiting embodiment, oil fill tube apparatus 100A can be configured to facilitate a transmission of oil into an oil tank of a vehicle or other object (e.g., lawn mower, weed whacker, leaf blower, etc.) comprising an oil tank. The various elements of apparatus 100A can include, but are not limited to, base portion 102, grip portion 104, valley portion 106, threaded stem portion 108, set of crossed line indentations 110, O-ring element 120, stem opening portion 130, external thread portion 140, second straight cylindrical portion 150, fifth sloped cylindrical portion 152, first surface of the first surface of the sloped cylindrical portion 154, first straight cylindrical portion 160, hollow shaft portion 320 (e.g., formed by the three-dimensional space connecting BCW), mouth opening portion 340, pitch 350, mouth inner wall diameter BC (formed by connecting point B to point C), mouth outer wall diameter AD (formed by connecting point A to point D), first outer wall AE (formed by connecting point A to point E), second outer wall DH (formed by connecting point D to point H), stem inner wall diameter FG (formed by connecting point F to point G), stem outer wall diameter EH (formed by connecting point E to point H), stem-funnel intersection WX (formed by connecting point W to point X), first stem length WF (formed by connecting point W to point F), and second stem length XG (formed by connecting X to point G).

In an aspect, illustrated is a fill tube apparatus 100A comprising an inner tube funnel element (e.g., formed by the three-dimensional area connecting points B, C, X, G, F, W, and B) comprising a mouth opening portion 210, a hollow shaft portion 320, a hollow stem portion 360, and a stem opening portion 130. The fill tube apparatus 100A also comprises an outer tube element comprising an outer wall portion AE (e.g., the illustrated wall connecting point A to point E), DH (e.g., although outer wall portion is one continuous structure, the cross-sectional view illustrates a first outer wall portion AE and a second outer wall portion DH which are both part of one single outer wall that circumscribes the apparatus) and an inner wall portion BF, CG, wherein the first outer wall portion AE can correspond with apparatus 100A regions, such as, base portion 102, grip portion 104, valley portion 106, and threaded stem portion 108.

The various elements and portions of apparatus 100A provide an internal funnel-stem cavity structure and a customized exterior structure that facilitates a mess-free, efficient, and user-friendly mechanism to fill oil into a vehicle oil tank. In an aspect, the cross-section illustration of apparatus 100A in FIG. 1A demonstrates the internal funnel portion bounded by points B, C, X and W. The apparatus is cylindrical so there are depth aspects not illustrated in the diagram that are elements of apparatus 100A. The funnel includes a mouth opening portion 210 that has a mouth inner wall diameter BC. The mouth inner wall diameter BC is wider than any other opening of apparatus 100A in order to facilitate a capture of oil from a canister into the internal funnel portion.

In an aspect, the mouth opening portion 210 has a large mouth inner wall diameter BC to facilitate a mess-free transmission of oil into an oil tank of a vehicle. There is a lower risk of a user pouring or dripping oil on the exterior of the oil tank of the vehicle because of the wide mouth opening portion 210 available to capture more oil for transfer into the funnel. Furthermore, the inner wall portion of the funnel region illustrated by points BW and CX are sloped downward and angled towards the center of oil drain tube apparatus 100A. In an aspect, this downward and inward slope enables the oil travelling into the mouth opening portion 210 and down the inner wall portion of apparatus 100A can gain momentum and in combination with gravitational forces keep a continuous flow towards the stem opening portion 130 of apparatus 100A and ultimately drain into an oil tank.

In yet another aspect, the surface finish of the funnel inner wall portion BW and/or CX can be smooth and/or polished. In an aspect, the smallest portion of the funnel inner wall portion can be power brushed. Furthermore, in an aspect, coolant can be poured in the inner circle to dissipate heat (e.g., keep the inside cool as cutting occurs) and improve a surface finish of the apparatus 100A. As such, in an aspect, very little resistance and friction is generated thus facilitating a constant and continuous flow of oil through the mouth opening portion 210, down the funnel inner wall portion, through the hollow stem portion W, X, F, G, out the stem opening portion 130 and into the oil tank of a vehicle. Furthermore, the smooth funnel inner wall portion BW and CX coupled with its inward sloping and angled feature allows for an increase in fluid velocity across the funnel inner walls, facilitates a continuous flow of even higher density and higher viscosity liquids across the funnel inner wall portion BW and CX surface. Consequently, the funnel inner surface portion allows for fewer forces to act upon the fluid passing over its surfaces as compared with fluids that pass over rougher surfaces. Furthermore, there can be less turbulence associated with liquids flowing through the funnel inner wall BW and CX of fill tube apparatus 100A and a friction factor associated with apparatus 100A that corresponds to a significantly smooth pipe (e.g., versus a rough pipe).

In another aspect, a stem funnel intersection portion WX of apparatus 100A indicates the region of the fill tube apparatus 100A where the funnel converges with a hollow stem portion 360. In an aspect, the stem funnel intersection portion WX (e.g., dashed line connecting point W and point X) represents a diameter of the region where the hollow shaft portion 320 meets the hollow stem portion 360. In an aspect, this region is where disparate streams of liquid (e.g., oil) captured by the mouth opening portion 210 travels through the funnel and is converged into a focused stream of liquid that can flow directly into an oil tank of a vehicle. Furthermore, funnel intersection portion WX (e.g., diameter) is smaller than mouth inner wall diameter BC and approximately the same diameter as stem inner wall diameter FG.

Thus, the cavity corresponding to the inner tube funnel element narrows from mouth inner wall diameter BC to stem opening portion 130 which facilitates the convergence of liquids travelling down the inner wall portions of apparatus 100A. Also, in an aspect, hollow shaft portion 320 can be a narrow cavern that facilitates the convergence of disparate streams of the traveling liquid along the conical inner wall of the funnel portion (e.g., BW and CX are part of one continuation cylindrical inner wall) of apparatus 100A into a focused stream. Furthermore, the focused stream of liquid travels through an opening in the stem (e.g., stem opening portion 130) of apparatus 100A directly into the oil tank without allowing for any spillage, splattering, or oil messes outside of apparatus 100A.

In another aspect, apparatus 100A comprises an outer tube element comprising an outer wall portion that circumscribes the inner tube funnel element. The length from a first outer point of the outer wall portion to a second outer point of the outer wall diametrically opposite to the first outer point varies at several regions along the outer wall portion. For instance, a first outer diameter between first outer wall point A to second outer wall point D within base portion 102 of apparatus 100A is greater than a second outer diameter between third outer wall point E and fourth outer wall point H within threaded stem portion 108 of apparatus 100A.

In another aspect of apparatus 100A, the inner tube funnel element comprising a hollow stem portion 360 is circumscribed by an external thread portion 140. In an aspect, external thread portion 140 can be a raised helical threading that winds around the stem region of apparatus 100A, forming an outer wall of threading capable of adjoining with another component comprising a complimentary threading element. For instance, in an aspect, external thread portion 140 (e.g., a protruding thread helically wound around the stem exterior wall) can represent a male threading portion of apparatus 100A and such threading can be interlocked with a complimentary female threading portion that circumscribes an inner wall of an oil tank opening. Furthermore, in an aspect, the oil tank female threading can take the form of an indented threading or threaded grooves designated to fit the male threaded stem portion 108 of apparatus 100A.

Furthermore, the apparatus 100A can be screwed into the oil tank opening using a circular twisting motion such that the threaded stem portion 108 and indented threading portion of the oil tank opening are interlocked together. As such the hollow stem portion 360 can extend into the opening of the oil tank and stem opening portion 130 can deposit a liquid (e.g., oil) directly into the chamber of the oil tank. In another aspect, the interlocking nature of fill tube apparatus 100A and the oil tank opening allows for a seamless, continuous, and mess free transition of oil through the funnel and stem region of apparatus 100A and directly into the oil tank of the vehicle. In another non-limiting embodiment, apparatus 100A can be customized to have an indented threading portion (rather than the protruding threaded stem portion 108 shown in FIG. 1A) representing a female threading on the outer wall of the stem to complimentarily connect with a male threading portion circumscribing an opening of an oil tank.

As such, the threaded stem portion 108 can comprise a range of thread sizes with differing threading pitches, leads, and thread types (e.g., raised male threading or indented female threading) to integrate with a wide range of vehicle oil tank types. In yet another aspect, pitch 350 of threaded stem portion 108 can be varied in distance and measurement. In a non-limiting embodiment, a pitch 350 measurement can be between 1 mm and 4 mm threads per inch depending on the needs of the apparatus (e.g., integrates with a variable sized oil tank opening). Furthermore, in a non-limiting embodiment, an outer diameter of a thread can be between 10 mm and 25 mm. However, in other embodiments, the pitch 350 measurements can vary and the thread diameters can vary to meet the requirements of complimentary threading portions of different vehicle oil tank models. For instance, the vehicle motor oil tank opening can be smaller or larger for different oil tank models, vehicle brands, or vehicle types.

As such, the stem opening portion 130 can be configured or manufactured to have a larger or smaller diameter, the hollow shaft portion 320 can be configured or manufactured to have a larger or smaller diameter, the threaded stem portion 108 can vary in number of threads or size of threads, and/or the pitch 350 measurement can be varied to meet the integration requirements of a particular vehicle oil tank and oil tank opening requirement. Furthermore, in an aspect, the angle can vary between the transition from the hollow stem portion 360 to the hollow shaft portion 320 (increased to be steeper or decreased to be less steep based on size requirements of stem opening portion 130 or threaded stem portion 108). In a non-limiting aspect, the pitch 350 measurement can vary between 1 mm-4 mm for respective embodiments of the apparatus to fit various models of vehicle oil tanks.

In other non-limiting embodiments, the major diameter (outer diameter) of threading can vary between 10 mm and 25 mm to fit various model vehicle oil tanks. Similarly, in other non-limiting embodiments, the mouth opening portion 210 inside diameter can be between 1 inch to 1.25 inches. In another aspect, all dimensions (e.g., size, measurements, configurations, etc.) can be adjusted to fit different vehicle oil tank models and types. Also, the apparatus can be comprised of a material that can be varied as well to be metals (e.g., steel, aluminum), plastic, synthetic polymers (e.g., polyoxymethylene), nylon, acrylic, ceramic, or other such materials. In another aspect, the fill tube apparatus 100A can be anodized pursuant to any of a range of anodization processes to provide a coat (e.g., metal coat such as aluminum) around the exterior of the fill tube apparatus. In an aspect, the anodized exterior layer can provide a protective oxide coating on the fill tube apparatus 100A as well as provide various colors to the apparatus. The colors can match a particular color scheme of a vehicle and/or oil tank associated with a vehicle such that the fill tube apparatus appears as an extension of the vehicle itself (from a color integration perspective). In yet another aspect, a chromate conversion coating can be applied to the exterior of the fill tube apparatus 100A to provide a seal to the outside material of the fill tube apparatus. As such, the chromate conversion coating can prevent corrosion to the fill tube apparatus 100A and can be utilized as a primer to further apply paint layers to the surface of the fill tube apparatus 100A.

The thread pitch 350 is the distance between threads, measured along the length of the threaded stem portion 108. Accordingly, in several embodiments, threaded stem portion 108 can comprise a range of lengths of thread pitch 350. In other embodiments, the thread count which is a measure of threads per inch of threaded stem portion 108 (e.g., the region where the threading is helically wound around the apparatus stem) can be any of a variety of thread counts as well to match the complimentary threading lining the inner opening of an oil tank. In several other embodiments, the threaded stem portion 108 can vary in thread angle (e.g., angle between threads), thread depth (e.g., height from root to crest), pitch diameter, minor diameter, major diameter (e.g., outside diameter), number of crests, number of roots, and/or helical angle as well.

In another aspect, some embodiments of application 100A can include an O-ring element 120. In an aspect, the O-ring element 120 can be a round washer comprised of a material (e.g., rubber) configured to create a tight seal when interfacing with another surface. For instance, O-ring element 120 can interface with a top surface surrounding the opening of a vehicle oil tank. The interface with the surface of the vehicle oil tank can form a tight seal (e.g., suction) to ensure that during transmission of oil through the inner tube funnel element of apparatus 100A and into the gas tank, there is no spillage or seepage of the oil through cracks or openings at the connection point between apparatus 100A (e.g., external thread portion 140) and the oil tank (e.g., oil tank opening).

In another aspect, apparatus 100A comprises an outer wall portion comprising a base portion 102, a grip portion 104, a valley portion 106, and a threaded stem portion 108. In an aspect, the outer wall portion of fill tube apparatus 100A is not intended to come in contact with oil that passes through the inner wall portion of fill tube apparatus 100A. Instead the outer wall portion is a cylinder that wraps around the inner wall portion of apparatus 100A. In an aspect, a cross-sectional view of the outer wall portion is illustrated as a connection between points A and E as well as points D and H respectively. Alternatively, the inner wall portion is depicted in a cross-sectional view as a connection between points B and F as well as points C and G respectively. In another aspect, a cross sectional view of the outer tube element can be represented by the points connecting A, B, F, and E. Furthermore, the points connecting C, D, H, and G can also be represented as part of the continuous outer tube element.

The outer tube element wraps around the inner tube funnel element and the thickness of the outer tube can vary at different regions of apparatus 100A. In an aspect, the regions of apparatus 100A include base portion 102, a grip portion 104, a valley portion 106, and a threaded stem portion 108. In an aspect, base portion 102 represents a region circumscribing the mouth opening portion 210 and extending to grip portion 104. In an aspect, the base portion 102 comprises an outer wall portion that is a smooth material, however grip portion 104 comprises an outer wall portion that can be a set of crossed line indentations 110 representing a pattern that facilitates a stable grip of the fill tube apparatus.

For instance, a user of apparatus 100A can use its hands and fingers to get a better grip on the grip portion 104. In an aspect, grip portion 104 can comprise any of a range of patterns such as a diamond pattern, a left-hand pattern (e.g., left hand diagonal) with a first helix angled lines, a right-hand pattern (e.g., right hand diagonal) with second helix angled lines opposite the first helix angled lines, or straight lines along an axis of the apparatus 100A. The set of crossed line indentations 110 allow for the existence of more resistance between the hand and the grip portion 104 such that a user can screw apparatus 100A into mouth opening portion 210 without having any slipping occur. Furthermore, the user may already have grease or oil on its hands from working with vehicle parts, as such the set of crossed line indentations 110 can mitigate any sliding or slippage in grip from occurring due to oil on the hands of the user. In an aspect, a users' hand can mold and fit within one or more crevice formed by the set of crossed line indentations 110. Thus, the grip between user hand and apparatus 100A can be tight and interlocked to a degree such that a user can effectively twist apparatus 100A into a linking position with an oil tank or stabilize the user by holding onto apparatus 100A while pouring oil into mouth opening portion 210.

In an aspect, the set of crossed line indentations 110 can be formed using a process referred to as knurling. In an aspect, the knurling process can form any of several indentation patterns on apparatus 100A at grip portion 104. For instance, grip portion 104 can take the form of an indented pattern of straight lines (e.g., cross hatched pattern), a form of indented lines that are angled (e.g., diamond pattern), an indented pattern of angular lines (e.g., diagonal line patterns). Furthermore, in an aspect, grip portion 104 can be customized to enhance the grip capabilities of users with varying hand predominance. For instance, a helical angle of the indented lines can be formed at grip portion 104 to be angled in a way that right hand users have a better grip (e.g., diagonal line starting in top right hand corner and extending towards lower left hand corner of grip portion 104).

In another instance, a helical angle of the indented lines can be formed at grip portion 104 to be angled in a way that left hand users have a better grip (e.g., diagonal line starting in top left hand corner and extending towards lower right hand corner of grip portion 104). In another aspect, any indented or raised line pattern of grip portion 104 can have a varying pitch (measurement between each indented line). For instance, a diamond pattern can have a coarse pitch (e.g., 13 pitch or less), a medium pitch (e.g., greater than 13 pitch, but less than a 33 pitch, such as a 20 pitch) or a fine pitch (e.g., 33 pitch or greater). Regardless of the knurling design, grip portion 104 provides a texture corresponding to such portion of the outer wall portion of apparatus 100A to facilitate a strong and stable user grip corresponding to the apparatus 100A.

In yet another aspect, the apparatus 100A may have a male knurled pattern, a female knurled pattern or a combination of both. For instance, the grip portion 104 can include depressed points that produce a male impression. In another instance, the knurling can be produced on a variety of surfaces such as a conical (e.g., or convex) surface of apparatus 100A. Furthermore, in a non-limiting embodiment, the knurling can be formed on a concave surface of apparatus 100A such as valley portion 106. As such, any of several knurling variations can be present in any one or more non-limiting embodiment of apparatus 100A.

In another aspect, a valley portion 106 is present between grip portion 104 and threaded stem portion 108. In an aspect, the outer wall corresponding to valley portion 106 slants inward (e.g., towards the center of apparatus 100A), then straightens out into a straight plane, and once again slants outward and again straightens (e.g., at reference numeral 150) out to form a structure resembling a valley. The valley portion 106 of apparatus 100A provides an appearance where the outer wall can resemble the slender funnel type shape that takes place internally to apparatus 100A by the hollow structure formed by the inner wall. Accordingly, at any given point along the regions between the inner wall and the outer wall of apparatus 100A, the thickness can vary.

For instance, the thickness formed by first outer wall point A and first inner wall point B between the outer wall and the inner wall is thinner than the thickness between the outer wall and the inner wall at any given region designated along grip portion 104. However, the thickness between point E and point F of the outer wall and inner wall within threaded stem portion 108 is closer to the thickness at first outer wall point A and first inner wall point B. Furthermore, in an aspect, the thickness between an inner wall and an outer wall at any longitudinal axis along apparatus 100A corresponds to a solid material interior. Accordingly, the inner wall and outer wall forms a solid barrier (e.g., not hollow) that forms around the hollow stem portion 360 and hollow shaft portion 320 of apparatus 100A.

In an aspect, the thickness between the inner wall and the outer wall portion of apparatus 100A can be varied or customized to be greater in thickness or smaller in thickness depending on the desire of a user. In another aspect, the apparatus 100A can be comprise of any of several materials such as an aluminum material, a steel material, an iron material, a copper material, or any combination of such materials. In an aspect, apparatus 100A can be utilized to interlock with any of a variety of oil tanks for any of several vehicles. For instance, apparatus 100A can be customized to integrate with any of several brands of motorcycles. In an aspect, apparatus 100A can be customized to fit the specific threading requirements of a motorcycle oil tank opening such that apparatus 100A can integrate seamlessly (e.g., with the threading mechanisms) with the particular oil tank.

Furthermore, the design and structure of the fill tube apparatus outer and inner wall can be formed to provide the best access to the oil tank even amongst the clutter of several motorcycle component parts crowded around the oil tank. As such, in a non-limiting embodiment, apparatus 100A can be a straight fill tube structure where the hollow cavity comprising the hollow shaft portion 320 and the hollow stem portion 360 are aligned in a straight line such that the oil can pass through directly into the oil tank without having to take many twists or turns that would otherwise slow down the speed of liquid traveling into the oil tank. However, in other embodiments, and for a particular vehicle (e.g., motorcycles of some types) oil tanks, apparatus 100A can be angled and twist to allow for easier access to the oil tank and easier oil tank filling capabilities depending upon the contours, shapes, and location of the particular motorcycle tank and motorcycle tank opening.

In yet another aspect, apparatus 100A can be customized (e.g., knurl design, shape of tube, contours of inner and outer walls, threading shape and/or size, etc.) to allow for integration of apparatus 100A with any of several all-terrain vehicles. For instance, apparatus 100A can be utilized to fill the oil tanks of quad vehicles (e.g., quad bikes), three-wheeler vehicles, four-wheeler vehicles, quadricycles, and other such vehicles. In another instance, apparatus 100A can be utilized to fill the oil tanks of any of several Utility Task Vehicles (UTV's), Recreational Off-Highway Vehicle (ROV's), or Multipurpose Off-Highway Utility Vehicle (MOHUV). Furthermore, apparatus 100A can integrate with the various types of oil tanks associated with ATV's, UTV's, MOHUV's and any of the several variations associated with oil tank products of any of several manufacturers of these oil tank products.

Figure 1B:
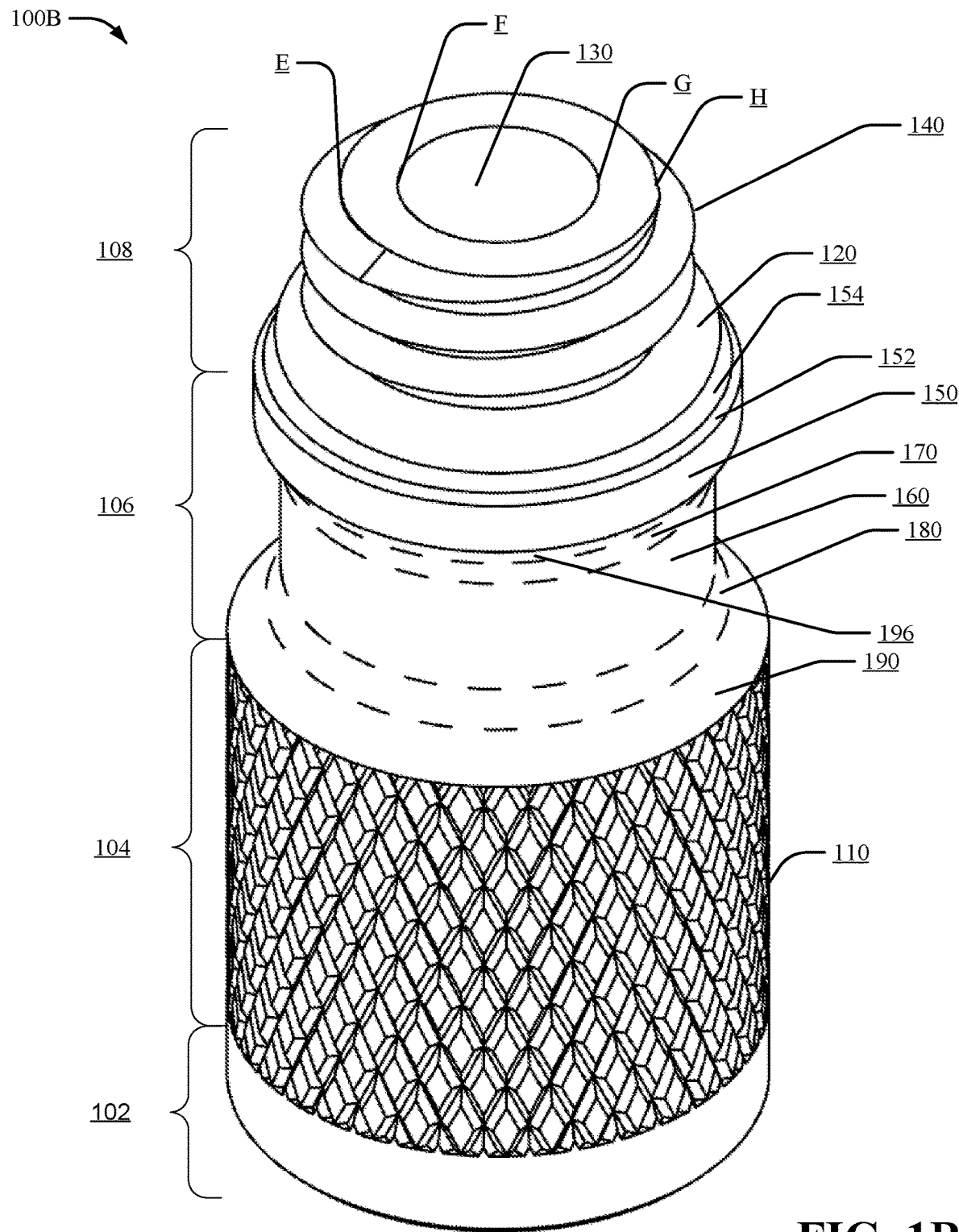
FIG. 1B illustrates a non-limiting example of an oil fill tube apparatus configured to facilitate an efficient transmission of oil to a vehicle oil tank component in accordance with one or more embodiments described herein.

Turning now to FIG. 1B, illustrated is a non-limiting example of an oil fill tube apparatus 100B configured to facilitate an efficient transmission of oil to a vehicle oil tank component in accordance with one or more embodiments described herein. Repetitive description of like elements employed in other embodiments described herein is omitted for sake of brevity.

In an aspect, FIG. 1B illustrates a non-limiting embodiment, that is an angled side view of the fill tube apparatus (e.g., referred to as apparatus 100B). In an aspect, apparatus 100B provides a different perspective view of apparatus 100A. In an aspect, a non-limiting fill tube apparatus 100B embodiment can be configured to facilitate a transmission of oil into an oil tank of a vehicle or other apparatus comprising oil tanks. The various elements of apparatus 100B shown in FIG. 1B can include, but are not limited to, base portion 102, grip portion 104, valley portion 106, threaded stem portion 108, set of crossed line indentations 110, O-ring element 120, stem opening portion 130, external thread portion 140, second straight cylindrical portion 150, fifth sloped cylindrical portion 152, first surface of the first surface of the sloped cylindrical portion 154, first straight cylindrical portion 160, third sloped cylindrical portion 170, fourth sloped cylindrical portion 196, pitch 350, stem inner wall diameter FG, and stem outer wall diameter EH.

In an aspect, this external view of apparatus 100B also includes the elements disclosed in FIG. 1A, even though such elements may not be viewable from the perspective view of the illustration. In another aspect, the grip portion 104 comprising a set of crossed line indentations 110 illustrates a diamond like embodiment shape of the textured pattern to facilitate a grip of apparatus 100B. In an aspect, the design of the set of crossed line indentations can be any of a range of designs including non-crossed lines (e.g., diagonal lines, squares, etc.). In another aspect, apparatus 100B illustrates stem outer wall diameter EX and stem inner wall diameter FG. The stem outer wall diameter EH is greater than the stem inner wall diameter FG. Furthermore, the stem outer wall diameter EX measures from a third outer wall point E of the threading to a fourth outer wall point H of the threading and the stem inner wall diameter measures from a third inner wall point F of the stem opening portion 130 to a fourth inner wall point G of the stem opening portion 130.

In another aspect, apparatus 100B illustrates a first cylindrical portion 190 that illustrates a starting point of valley portion 106 and an ending point of grip portion 104. The first cylindrical portion 190 transitions the outer wall of device 100B into an inward sloping wall. Furthermore, first sloped cylindrical portion 190 meets at second sloped cylindrical portion 180 which is a location on valley portion 106 where the outer wall continues to slope inward at a gradient until reaching a first straight cylindrical portion 160. In an aspect, the circumference of first sloped cylindrical portion 190 is greater than the circumference of second sloped cylindrical portion 180, which are both greater than first straight cylindrical portion 160.

Furthermore, in an aspect, the dashed lines in FIG. 1B (and other disclosed figures throughout) are representative of differing sizes of circumferences on the outer wall portion of apparatus 100B. The contours of apparatus 100B and other apparatus's disclosed herein can change at the areas depicted by the dashed lines (and in between the areas bounded by the dashed lines, other dashed lines, and solid lines). As such, the region of apparatus 100B referred to as valley portion 106 has a shape that gradually narrows until reaching first straight cylindrical portion 160 at which region the circumference stabilizes to the same measurement. As such, the valley portion 106 levels out on the outer surface at first straight cylindrical portion 160. In another aspect, the first straight cylindrical portion 160 transitions on the other end into third sloped cylindrical portion 170. In an aspect, third sloped cylindrical portion 170 is a region of the outer wall that begins to gradually slope away from first straight cylindrical portion 160 and the center of fill tube apparatus 100B.

In another aspect, fourth sloped cylindrical portion 196 is a portion of the external wall that slopes at an angle away from the center of fill tube apparatus 100B by extending from third sloped cylindrical portion 170. Accordingly, the circumference of fourth sloped cylindrical portion 196 is greater than the circumference of third sloped cylindrical portion 170 such that the thickness between the external wall and the internal wall in this region is becoming thicker, where the thickness increases going from third sloped cylindrical portion 170 to fourth sloped cylindrical portion 196. Furthermore, in another aspect, the end of the fourth sloped cylindrical portion 196 is the beginning of second straight cylindrical portion 150. The second straight cylindrical portion 150 can be a flattened portion of the external wall where the circumference of such region is equal along such portion. Thus, the portion of the external wall corresponding to second straight cylindrical portion 150 is vertical and creates a flat surface that is perpendicular to first surface of the fifth sloped cylindrical portion 154.

In an aspect, fifth sloped cylindrical portion 152 can be a portion of the external wall of apparatus 100B that begins to slope inward (e.g., toward the center of apparatus 100B) starting from an end point of second straight cylindrical portion 150. Furthermore, in an aspect, an end point of fifth sloped cylindrical portion 152 ends at first surface of the fifth sloped cylindrical portion 154. In an aspect, fifth sloped cylindrical portion 154 is a horizontal flat surface that is perpendicular to the crests of external thread portion 140. Furthermore, in an aspect, first surface of the fifth sloped cylindrical portion 154 is a flat surface capable of supporting O-ring element 120. For instance, O-ring element 120 can be stretched around external thread portion 140 and jostled down to the base of external thread portion 140.

Thus, the O-ring element 120 can rest upon the ledge represented by the region where the base of external thread portion 140 meets first surface of the fifth sloped cylindrical portion 154. Furthermore, the O-ring element 120 can also protect the first surface of the fifth sloped cylindrical portion 154 and the top surface near the opening of the oil tank from incurring wear and tear. The O-ring element 120 serves as an interface between the first surface of the fifth sloped cylindrical portion 154 and the top surface near the opening of the oil tank such that a tight seal is formed between apparatus 100B and the oil tank, but also to protect both surfaces from scraping against one another. As such, the first surface of the fifth sloped cylindrical portion 154 serves as a stable surface with sufficient room for the O-ring element 120 to stably rest.

Figure 2:
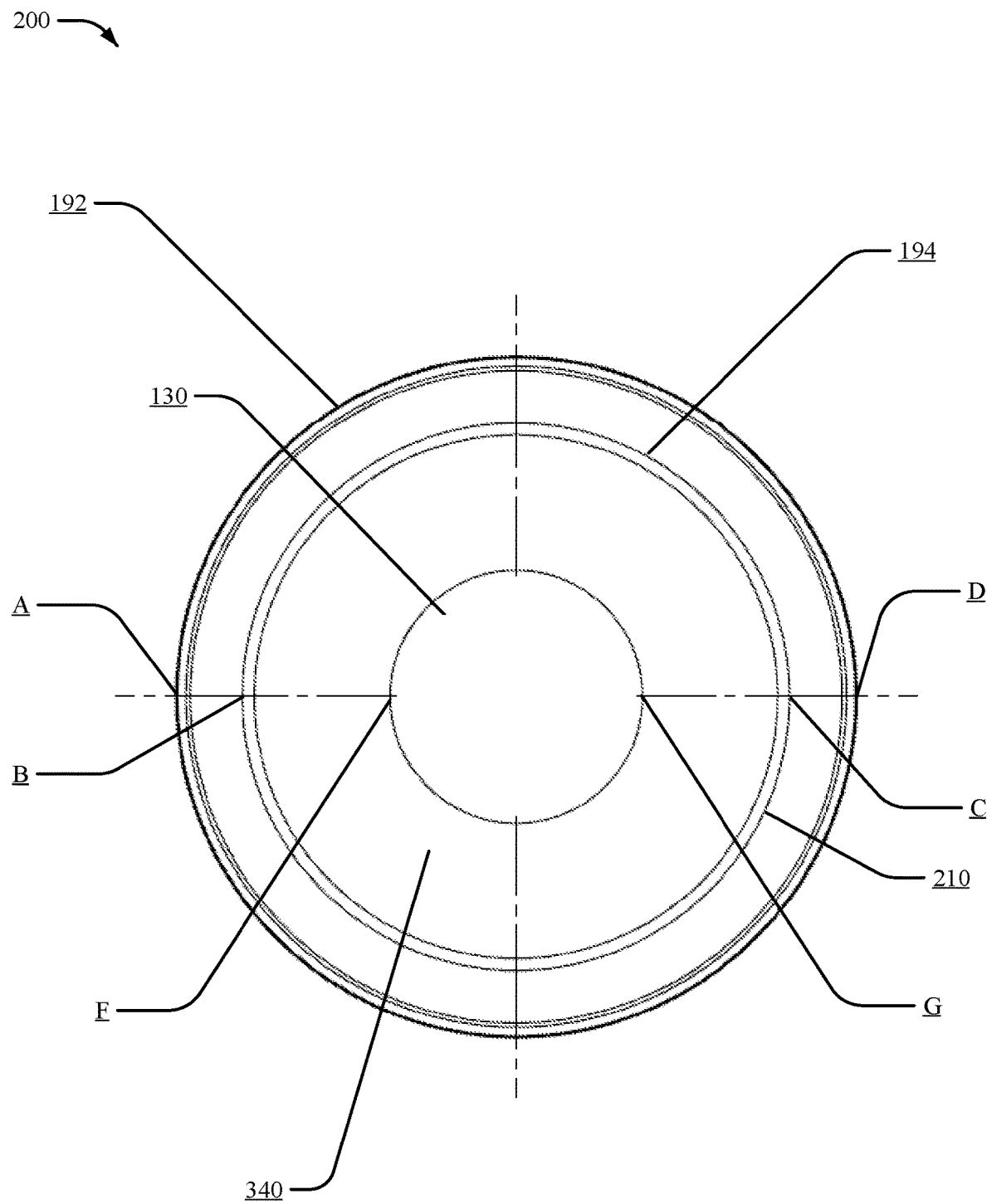
FIG. 2 illustrates a non-limiting example of a top perspective view of an oil fill tube apparatus configured to facilitate an efficient transmission of oil to a vehicle oil tank component in accordance with one or more embodiments described herein.

Turning now to FIG. 2, illustrated is a non-limiting example of a top perspective view of an oil fill tube apparatus 200 configured to facilitate an efficient transmission of oil to a vehicle oil tank component in accordance with one or more embodiments described herein. Repetitive description of like elements employed in other embodiments described herein is omitted for sake of brevity.

In an aspect, FIG. 2 illustrates a non-limiting embodiment of apparatus 200 that can include all the components and elements described in other embodiments described herein. FIG. 2 illustrates a top view perspective of apparatus 100A, 100B, and 200 (all different views of the same apparatus) such that the perspective illustrates a view of a user peering directly down at mouth opening portion 210. In an aspect, various elements of apparatus 200 shown in FIG. 2 include, but are not limited to, stem opening portion 130, mouth opening portion 210, outer wall portion 192, inner wall portion 194, first outer wall point A, second outer wall point D, mouth outer wall diameter AD, mouth inner wall diameter BC, first inner wall point B, second inner wall point C, and mouth inner wall diameter BC.

In an aspect, mouth outer wall diameter AD is longer (e.g., greater in length) than mouth inner wall diameter BC. Furthermore, outer wall portion 192 circumference is greater than inner wall portion 194 circumference, which are both respectively greater than the circumference of stem opening portion 130. In an aspect, looking down at the mouth opening portion 210 the hollow cavity, as illustrated, becomes narrower as the hollow shaft portion 320 transitions to the narrower hollow stem portion formed by points WXFG (not illustrated in FIG. 2) and terminates into stem opening portion 130.

Figure 3:
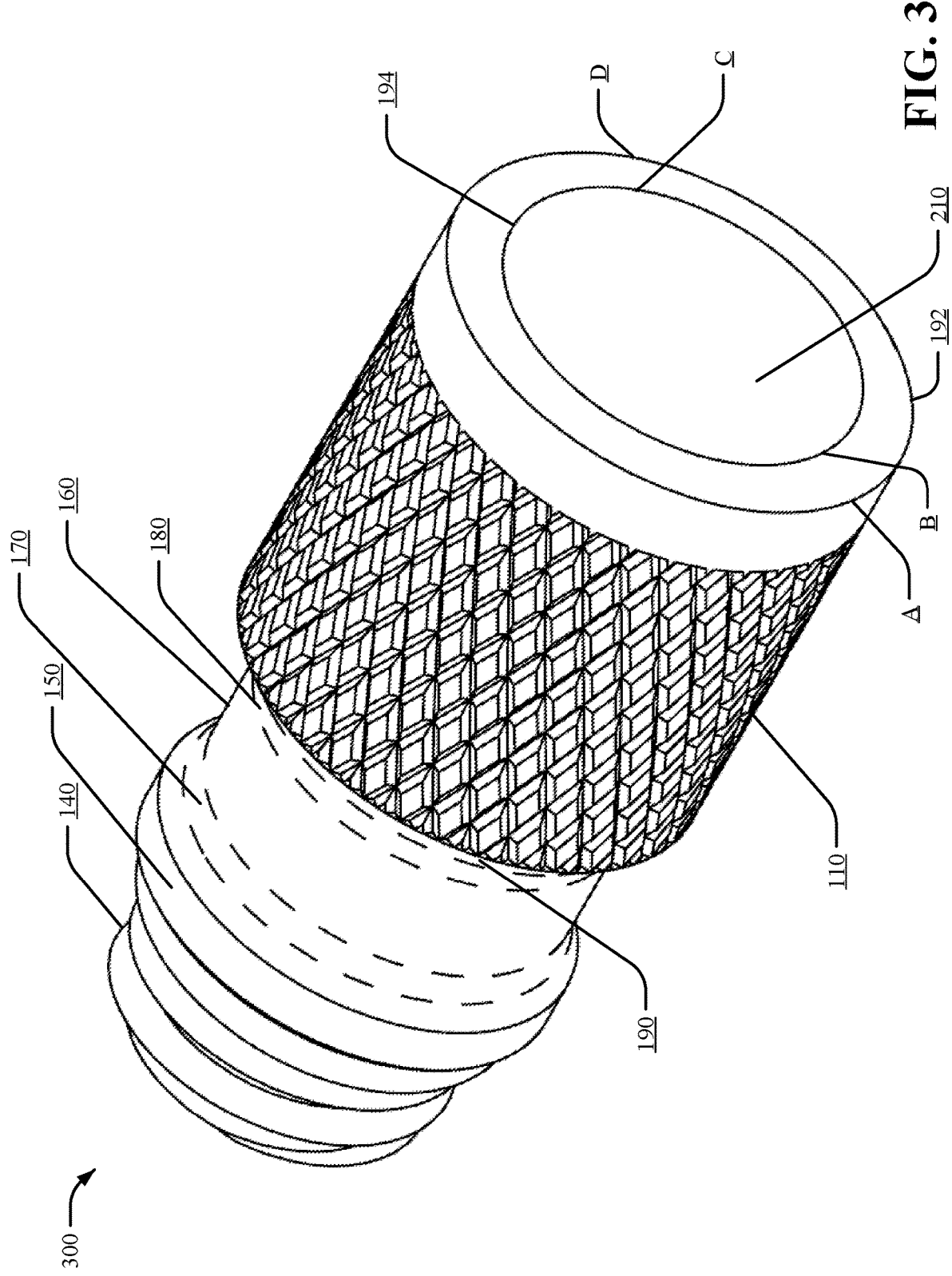
FIG. 3 illustrates a non-limiting example of a bottom-side angled perspective view of an oil fill tube apparatus configured to facilitate an efficient transmission of oil to a vehicle oil tank component in accordance with one or more embodiments described herein.

Turning now to FIG. 3, illustrated is a non-limiting example of a bottom-side angled perspective view of an oil fill tube apparatus 300 configured to facilitate an efficient transmission of oil to a vehicle oil tank component in accordance with one or more embodiments described herein. Repetitive description of like elements employed in other embodiments described herein is omitted for sake of brevity.

In an aspect, FIG. 3 illustrates a non-limiting embodiment of apparatus 300 that can include all the components and elements described in other embodiments described herein. In an aspect, FIG. 3 illustrates an angled view of fill tube apparatus 100A, 100B, 200, and 300 (all different views of the same apparatus) to demonstrate another perspective viewpoint of the components, features, shape, look, feel, and other aspects of apparatus 300. In an aspect, various elements of apparatus 300 shown in FIG. 3 include, but are not limited to, mouth opening portion 210, outer wall portion 192, inner wall portion 194, first outer wall point A, second outer wall point D, mouth outer wall diameter AD, mouth inner wall diameter BC, first inner wall point B, second inner wall point C, mouth inner wall diameter BC, set of crossed line indentation 110, external thread portion 140, second straight cylindrical portion 150, first straight cylindrical portion 160, third sloped cylindrical portion 170, second sloped cylindrical portion 180, and first sloped cylindrical portion 190.

Figure 4:
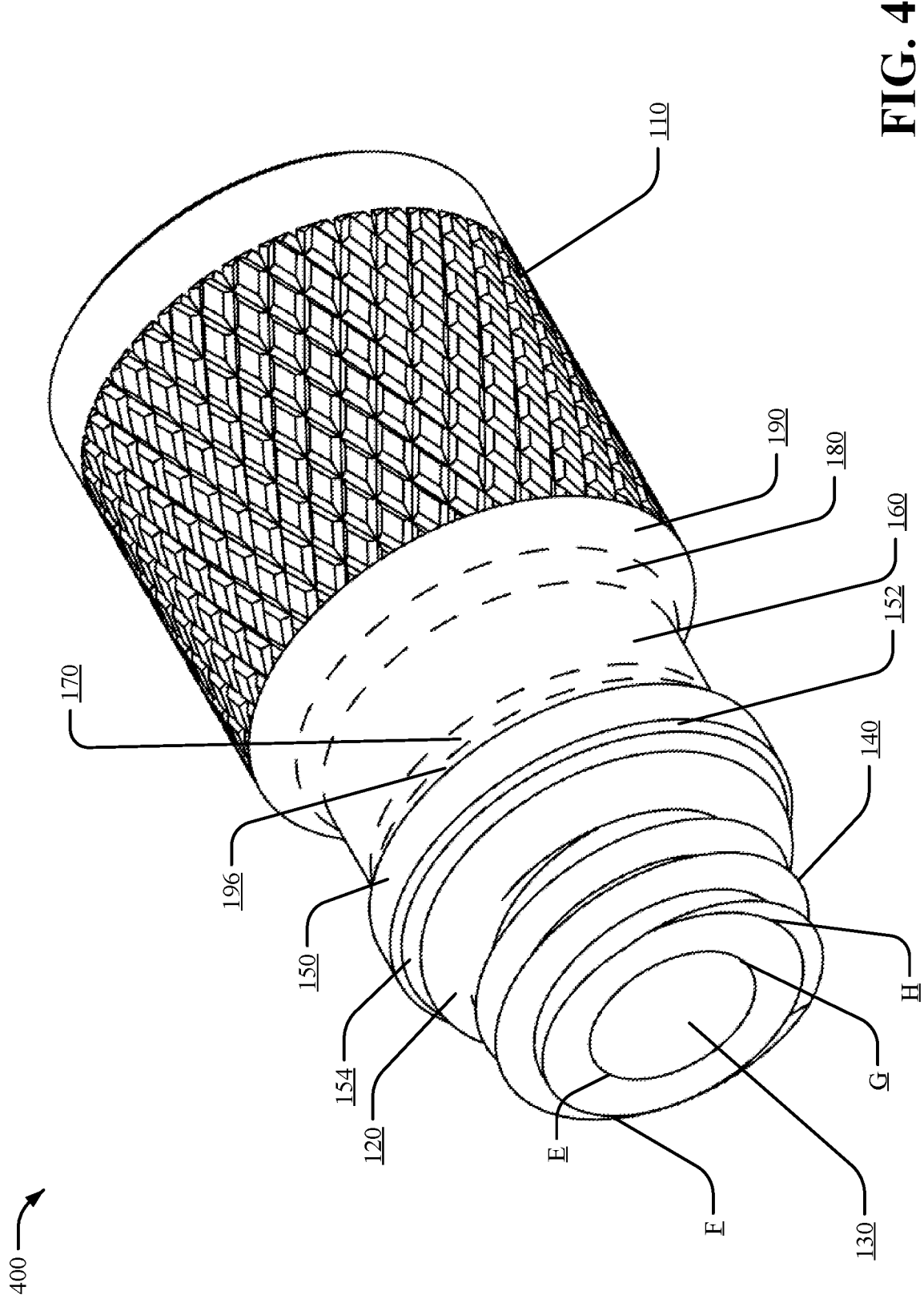
FIG. 4 illustrates a non-limiting example of a top-side angled perspective view of an oil fill tube apparatus configured to facilitate an efficient transmission of oil to a vehicle oil tank component in accordance with one or more embodiments described herein.

Turning now to FIG. 4, illustrated is a non-limiting example of a top-side angled perspective view of an oil fill tube apparatus configured to facilitate an efficient transmission of oil to a vehicle oil tank component in accordance with one or more embodiments described herein. Repetitive description of like elements employed in other embodiments described herein is omitted for sake of brevity.

In an aspect, FIG. 4 illustrates a non-limiting embodiment of apparatus 400 that can include all the components and elements described in other embodiments described herein. In an aspect, FIG. 4 illustrates an angled view of fill tube apparatus 100A, 100B, 200, 300, and 400 (all different views of the same apparatus) to demonstrate another perspective viewpoint of the components, features, shape, look, feel, and other aspects of apparatus 400 and other embodiments disclosed herein. In an aspect, various elements of apparatus 400 shown in FIG. 4 include, but are not limited to, stem opening portion 130, third outer wall point E, fourth outer wall point H, stem outer wall diameter EH, stem inner wall diameter FG, third inner wall point F, fourth inner wall point G, set of crossed line indentation 110, stem opening portion 130, external thread portion 140, second straight cylindrical portion 150, fifth sloped cylindrical portion 152, first surface of the fifth sloped cylindrical portion 154, first straight cylindrical portion 160, third sloped cylindrical portion 170, second sloped cylindrical portion 180, first sloped cylindrical portion 190, and fourth sloped cylindrical portion 196.

In an aspect, stem outer wall diameter EH is greater than stem inner wall diameter FG. Furthermore, a circumference of the stem opening portion 130 is smaller than the circumference of the outer wall circumscribing the stem opening portion 130, and both circumferences are smaller than the circumference of mouth opening portion 210 (not shown in illustration). Furthermore, in an aspect, the circumference of second straight cylindrical portion 150 is greater than the circumference of fourth sloped cylindrical portion 196 which are both greater than the circumference of third sloped cylindrical portion 170.

Also, in an aspect, second straight cylindrical portion 150, fourth sloped cylindrical portion, and third sloped cylindrical portion 170 each respectively have a greater circumference than first straight cylindrical portion 160. In another aspect, first sloped cylindrical portion 190 has a circumference that is greater than the circumference of second sloped cylindrical portion 180, which are both respectively greater than the circumference of first straight cylindrical portion 160.

Figure 5A:
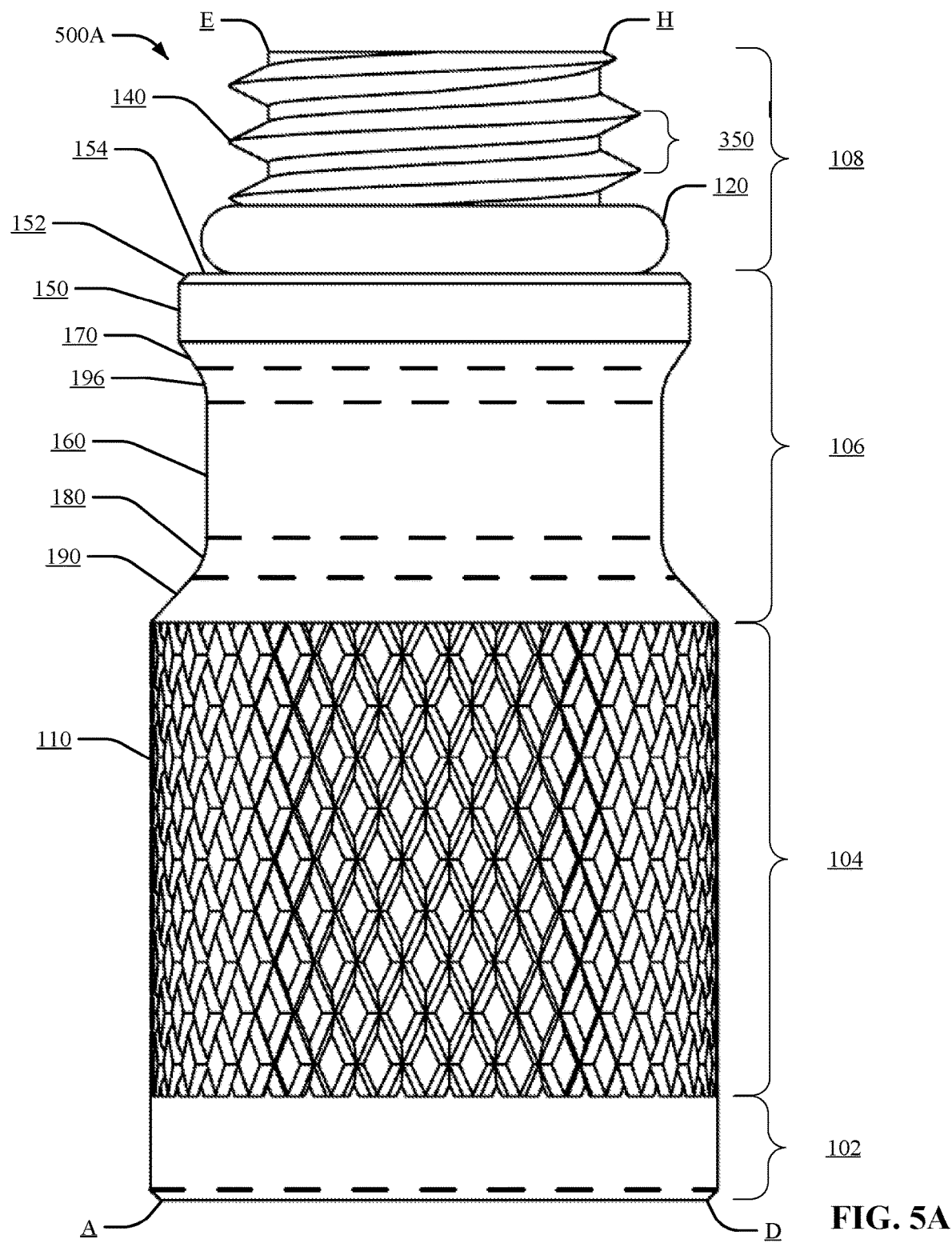
FIG. 5A illustrates a non-limiting high-level diagram of a side profile perspective view of an oil fill tube apparatus including an O-ring element configured to facilitate an efficient transmission of oil to a vehicle oil tank component in accordance with one or more embodiments described herein.

Turning now to FIG. 5A, illustrated is a non-limiting high-level diagram of a side profile perspective view of an oil fill tube apparatus 500A including an O-ring element 120 configured to facilitate an efficient transmission of oil to a vehicle oil tank component in accordance with one or more embodiments described herein. Repetitive description of like elements employed in other embodiments described herein is omitted for sake of brevity.

In an aspect, FIG. 5A illustrates a non-limiting embodiment of apparatus 500A that can include all the components and elements described in other embodiments described herein. In an aspect, FIG. 5A illustrates an angled view of fill tube apparatus 100A, 100B, 200, 300, 400, and 500A (all different views of the same apparatus) to demonstrate another perspective viewpoint of the components, features, shape, look, feel, and other aspects of apparatus 500A and other embodiments disclosed herein. In an aspect, various elements of apparatus 500A shown in FIG. 5A include, but are not limited to, base portion 102, grip portion 104, valley portion 106, threaded stem portion 108, first outer wall point A, second outer wall point D, mouth outer wall diameter AD, third outer wall point E, fourth outer wall point H, stem outer wall diameter EH, set of crossed line indentation 110, O-ring element 120, external thread portion 140, second straight cylindrical portion 150, fifth sloped cylindrical portion 152, first surface of the fifth sloped cylindrical portion 154, first straight cylindrical portion 160, third sloped cylindrical portion 170, second sloped cylindrical portion 180, first sloped cylindrical portion 190, fourth sloped cylindrical portion 196, and pitch 350.

In an aspect, the diameter of first sloped cylindrical portion 190 is greater than, second sloped cylindrical portion 180, which diameters are both respectively greater than first straight cylindrical portion 160. In another aspect, second straight cylindrical portion 150 has a diameter that is greater than the diameter of third sloped cylindrical portion 170, and both respectively have diameters that are greater than fourth sloped cylindrical portion 196. Furthermore, all three of second straight cylindrical portion 150, third sloped cylindrical portion 170, and fourth sloped cylindrical portion 196 have respective diameters that are greater than first straight cylindrical portion 160. In another aspect, second straight cylindrical portion 150 has a diameter that is greater than fifth sloped cylindrical portion 154.

Figure 5B:
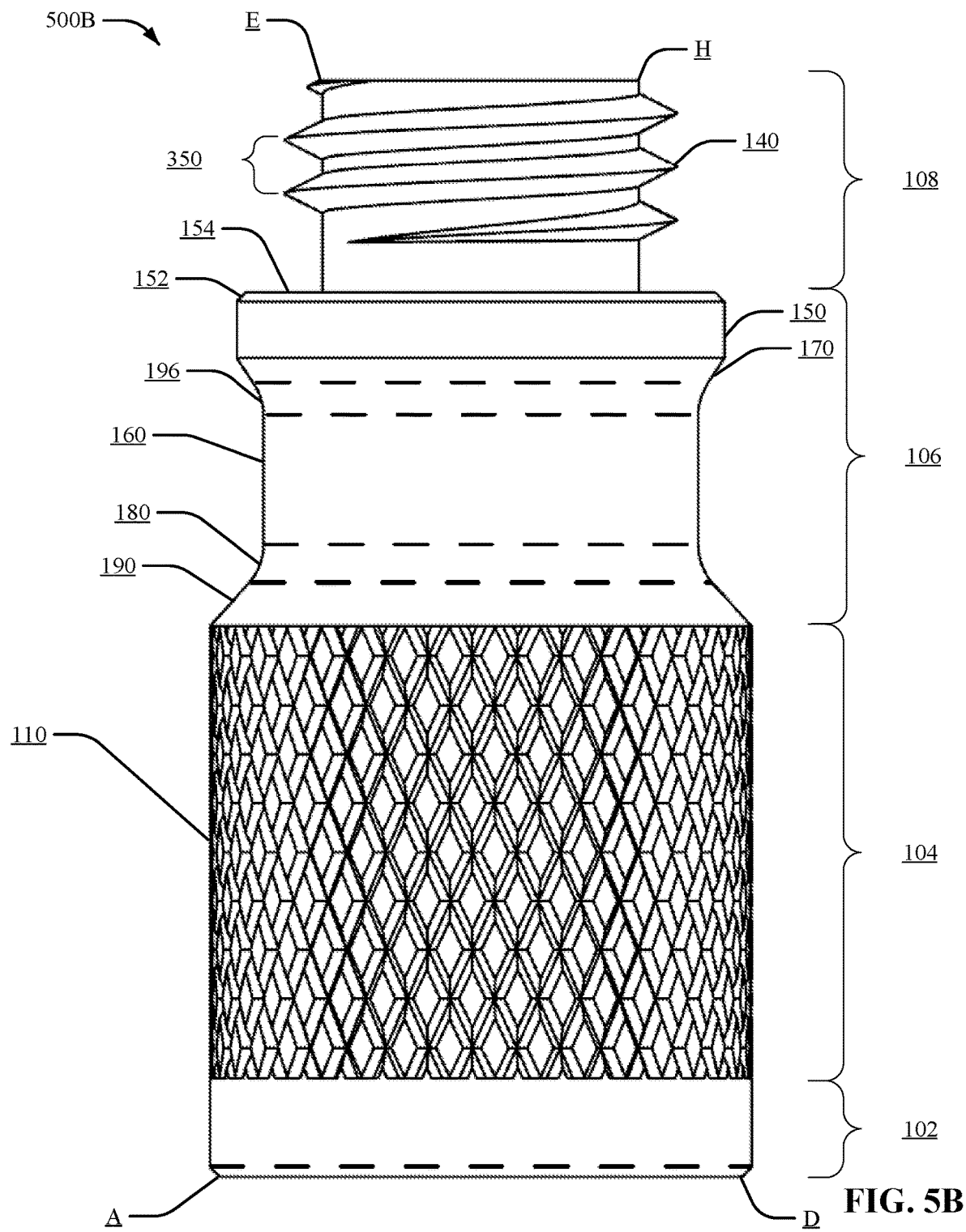
FIG. 5B illustrates a non-limiting high-level diagram of a side profile perspective view of an oil fill tube apparatus without the O-ring element configured to facilitate an efficient transmission of oil to a vehicle oil tank component in accordance with one or more embodiments described herein.

Turning now to FIG. 5B, illustrated is a non-limiting high-level diagram of a side profile perspective view of an oil fill tube apparatus without the O-ring element 120 configured to facilitate an efficient transmission of oil to a vehicle oil tank component in accordance with one or more embodiments described herein.

In an aspect, FIG. 5B illustrates a non-limiting embodiment of apparatus 500B that can include all the components and elements described in other embodiments described herein. In an aspect, FIG. 5A illustrates an angled view of fill tube apparatus 100A, 100B, 200, 300, 400, 500A, and 500B (all different views of the same apparatus) to demonstrate another perspective viewpoint of the components, features, shape, look, feel, and other aspects of apparatus 500B and other embodiments disclosed herein. In an aspect, various elements of apparatus 500B shown in FIG. 5B include, but are not limited to, base portion 102, grip portion 104, valley portion 106, threaded stem portion 108, first outer wall point A, second outer wall point D, mouth outer wall diameter AD, third outer wall point E, fourth outer wall point H, stem outer wall diameter EH, set of crossed line indentation 110, external thread portion 140, second straight cylindrical portion 150, fifth sloped cylindrical portion 152, first surface of the fifth sloped cylindrical portion 154, first straight cylindrical portion 160, third sloped cylindrical portion 170, second sloped cylindrical portion 180, first sloped cylindrical portion 190, fourth sloped cylindrical portion 196, and pitch 350. In an aspect, FIG. 5B unlike FIG. 5A does not have an O-ring element 120.

Figure 6:
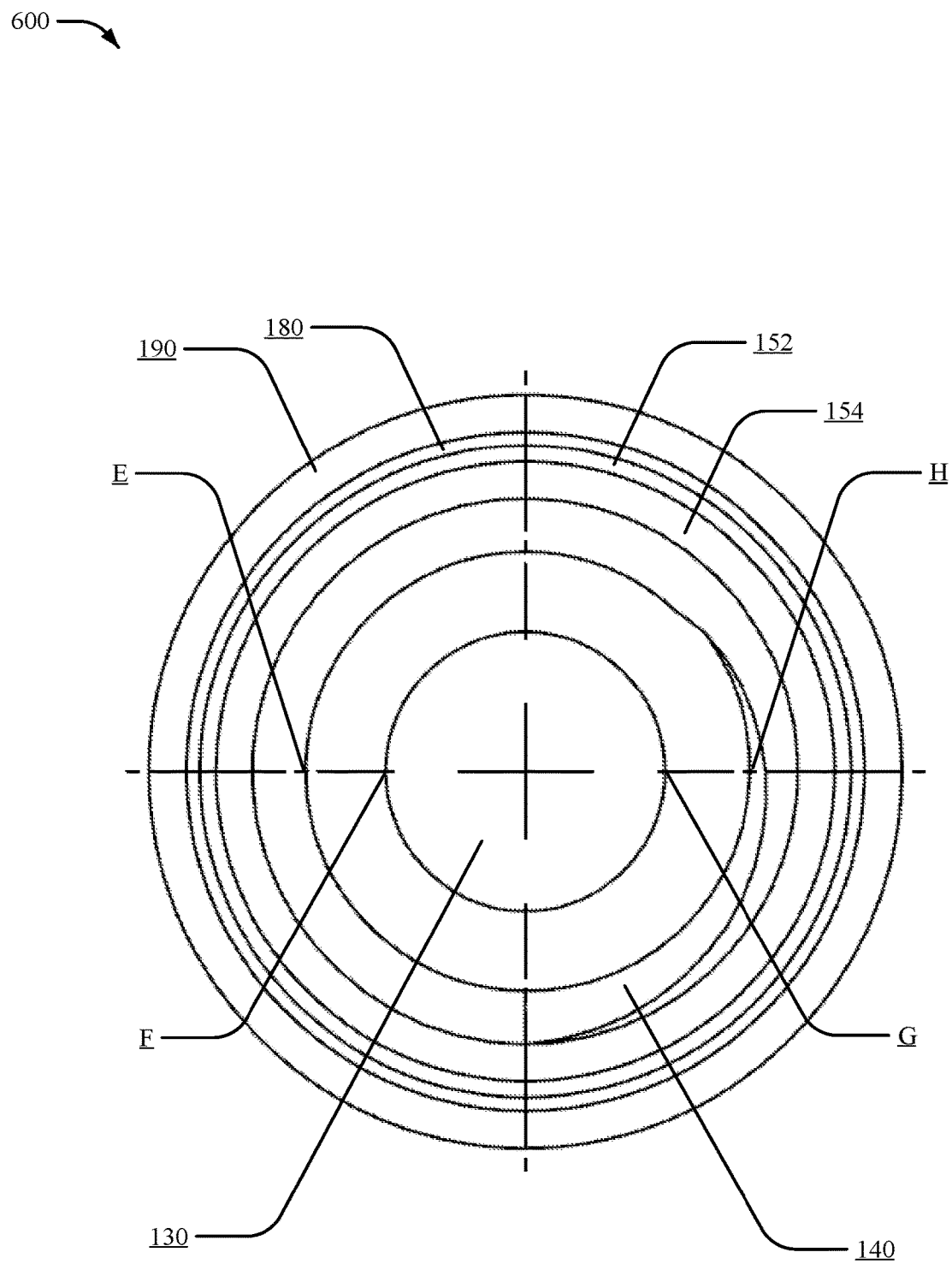
FIG. 6 illustrates a non-limiting example of a bottom perspective view of an oil fill tube apparatus configured to facilitate an efficient transmission of oil to a vehicle oil tank component in accordance with one or more embodiments described herein.

Turning now to FIG. 6, illustrated is is a non-limiting example of a bottom perspective view of an oil fill tube apparatus 600 configured to facilitate an efficient transmission of oil to a vehicle oil tank component in accordance with one or more embodiments described herein. Repetitive description of like elements employed in other embodiments described herein is omitted for sake of brevity.

In an aspect, FIG. 6 illustrates a non-limiting embodiment of apparatus 600 that can include all the components and elements described in other embodiments described herein. In an aspect, FIG. 6 illustrates an angled view of fill tube apparatus 100A, 100B, 200, 300, 400, 500A, 500B, and 600 (all different perspective views of the same apparatus) to demonstrate another perspective viewpoint of the components, features, shape, look, feel, and other aspects of apparatus 600 and other embodiments disclosed herein. FIG. 6 illustrates an overhead view of apparatus 600 such that the perspective illustrates a view peering directly down at stem opening portion 130. In an aspect, various elements of apparatus 600 shown in FIG. 6 include, but are not limited to, stem opening portion 130, external thread portion 140, fifth sloped cylindrical portion 152, first surface of the fifth sloped cylindrical portion 154, second sloped cylindrical portion 180, first sloped cylindrical portion 190, third outer wall point E, third inner wall point F, fourth inner wall point G, further outer wall point H, stem outer wall diameter EH, and stem inner wall diameter FG.

In an aspect, stem outer wall diameter EH is greater than stem inner wall diameter FG. Furthermore, the stem outer wall portion circumference is greater than the inner wall portion circumference, which are both respectively smaller than the circumference of mouth opening portion 210 (not illustrated). In an aspect, looking down at the stem opening portion 130 the hollow cavity, becomes wider as the hollow stem portion formed by points WXFG (not illustrated in FIG. 6) transitions into funnel portion 320 (not illustrated) and terminates into mouth opening portion 210.

Figure 7:
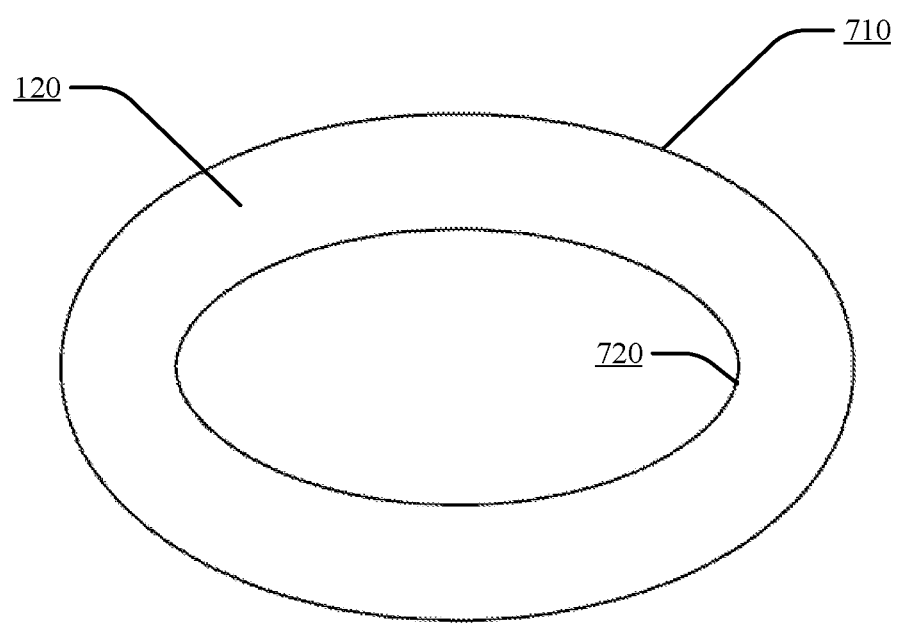
FIG. 7 illustrates a non-limiting high-level diagram of an angled perspective view of an O-ring element of an oil fill tube apparatus configured to facilitate an efficient transmission of oil to a vehicle oil tank component in accordance with one or more embodiments described herein.

Turning now to FIG. 7 illustrated is a non-limiting high-level diagram of an angled perspective view of an O-ring element 120 of an oil fill tube apparatus configured to facilitate an efficient transmission of oil to a vehicle oil tank component in accordance with one or more embodiments described herein. Repetitive description of like elements employed in other embodiments described herein is omitted for sake of brevity.

In an aspect, FIG. 7 illustrates a non-limiting embodiment of a component 700 of the fill tube apparatus that can include all the components and elements described in other embodiments described herein. In an aspect, FIG. 7 illustrates an angled view of an O-ring element 120 of fill tube apparatus to demonstrate another perspective viewpoint of the components, features, shape, look, feel, and other aspects of apparatus, apparatus components and other embodiments disclosed herein. In an aspect, the angled view of O-ring element 120 illustrates O-ring outer wall 710 and O-ring inner wall 720. In an aspect, the circumference of O-ring outer wall 710 is greater than the circumference of O-ring inner wall 720. In another aspect, O-ring element 120 (also referred to as toric joint) is a mechanical gasket comprising an elastic-like material (e.g., rubber) that is capable of being seated in a groove and compressed between two or more parts in an assembly position. The compression between two or more parts creates a seal at the interface between the two or more parts.

In an instance, O-ring element 120 can be seated on first surface of the fifth sloped cylindrical portion 154 and is capable of being compressed between the first surface of the fifth sloped cylindrical portion 154 and the top surface surrounding an opening in an oil tank apparatus. The assembly between these components has enhanced sealing characteristics because the O-ring element 120 sitting between the interface of the fill tube apparatus and the oil tank creates a seal at such interface where a liquid such as oil that passes through the fill tube apparatus and into the oil tank is unlikely to spill outward at such interface because the O-ring element 120, being elastic and malleable, will block any escape of the liquid. As such, O-ring element 120 creates a seal between the fill tube apparatus (e.g., fill tube apparatus 100-600) and an oil tank.

Figure 8:
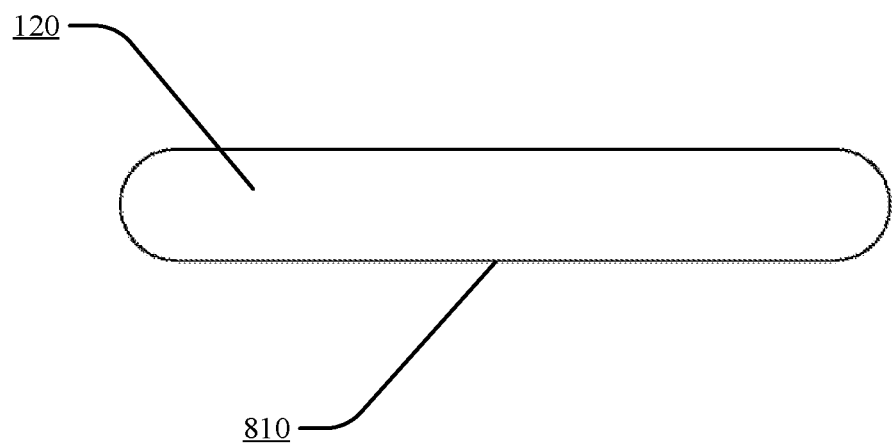
FIG. 8 illustrates a non-limiting high-level diagram of a side perspective view of the O-ring element of an oil fill tube apparatus configured to facilitate an efficient transmission of oil to a vehicle oil tank component in accordance with one or more embodiments described herein.

Turning now to FIG. 8, illustrated is a non-limiting high-level diagram of a side perspective view of the O-ring element of an oil fill tube apparatus configured to facilitate an efficient transmission of oil to a vehicle oil tank component in accordance with one or more embodiments described herein. Repetitive description of like elements employed in other embodiments described herein is omitted for sake of brevity. In an aspect, O-ring element 120 is illustrated from a side-view perspective. In an aspect, O-ring outer wall 710 is shown and the rounded shape of O-ring element 120 is demonstrated from a side view perspective.

Figure 9:
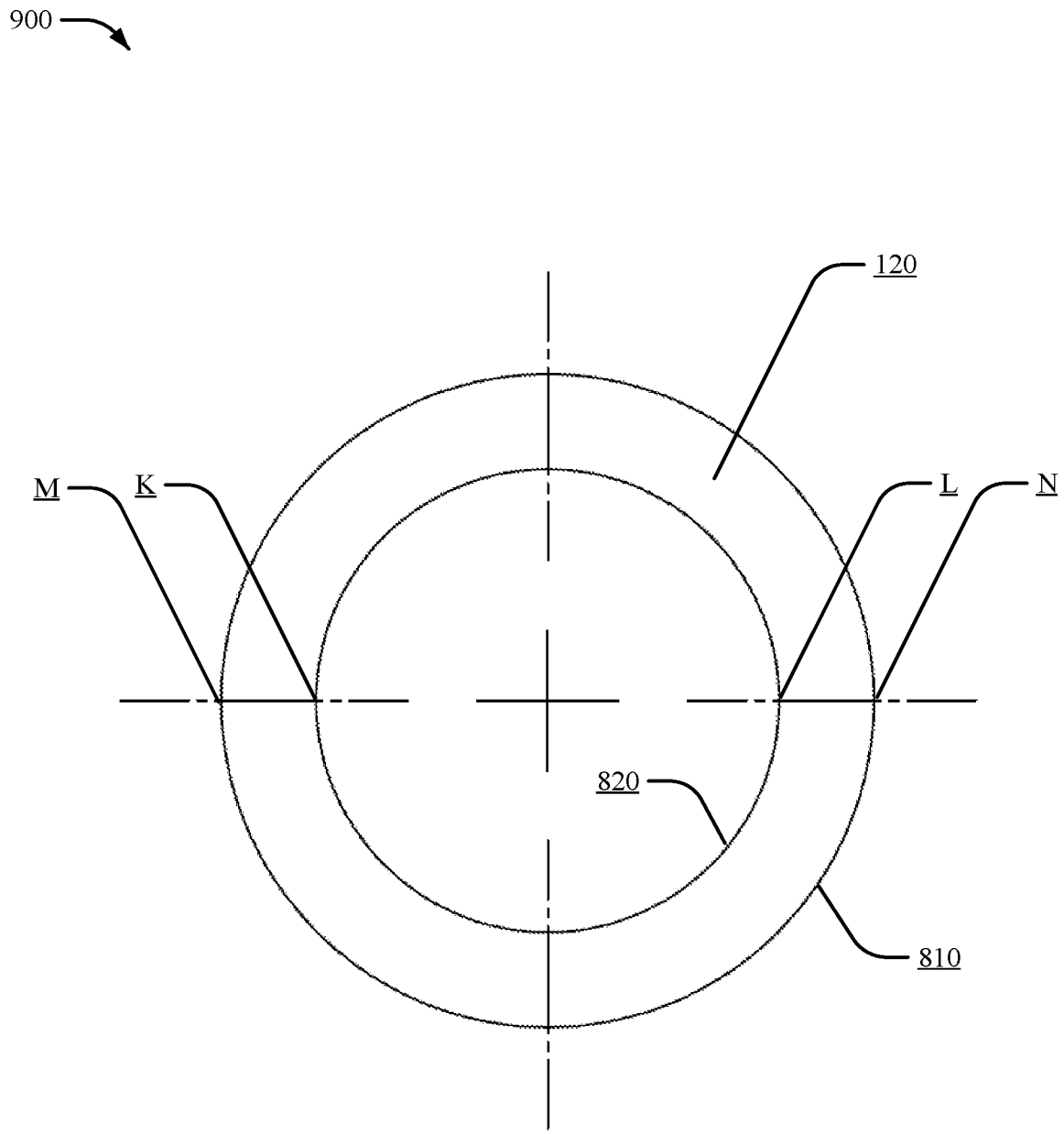
FIG. 9 illustrates a non-limiting high-level diagram of a top perspective view of the O-ring element of an oil fill tube apparatus configured to facilitate an efficient transmission of oil to a vehicle oil tank component in accordance with one or more embodiments described herein.

Turning now to FIG. 9, illustrated is a non-limiting high-level diagram of a top perspective view of the O-ring element 120 of an oil fill tube apparatus configured to facilitate an efficient transmission of oil to a vehicle oil tank component in accordance with one or more embodiments described herein. Repetitive description of like elements employed in other embodiments described herein is omitted for sake of brevity.

In an aspect, a top view perspective is illustrated for O-ring element 120. In an aspect, the round shape of the O-ring element 120 is apparent from the illustration. Also, in an aspect, first outer ring wall point M and second outer ring wall point N from outer ring wall diameter MN. In another aspect, first inner ring wall point K and second inner ring wall point L form inner ring wall diameter KL. In another aspect, outer ring wall diameter MN is a greater length than inner ring wall diameter KL. Furthermore, inner ring wall 720 and outer ring wall 710 are malleable and can allow O-ring element 120 to stretch around component parts of the fill tube apparatus such as external thread portion 140. Furthermore, in an aspect O-ring element can tighten around the base of external thread portion 140 due to its elasticity.

Figure 10:
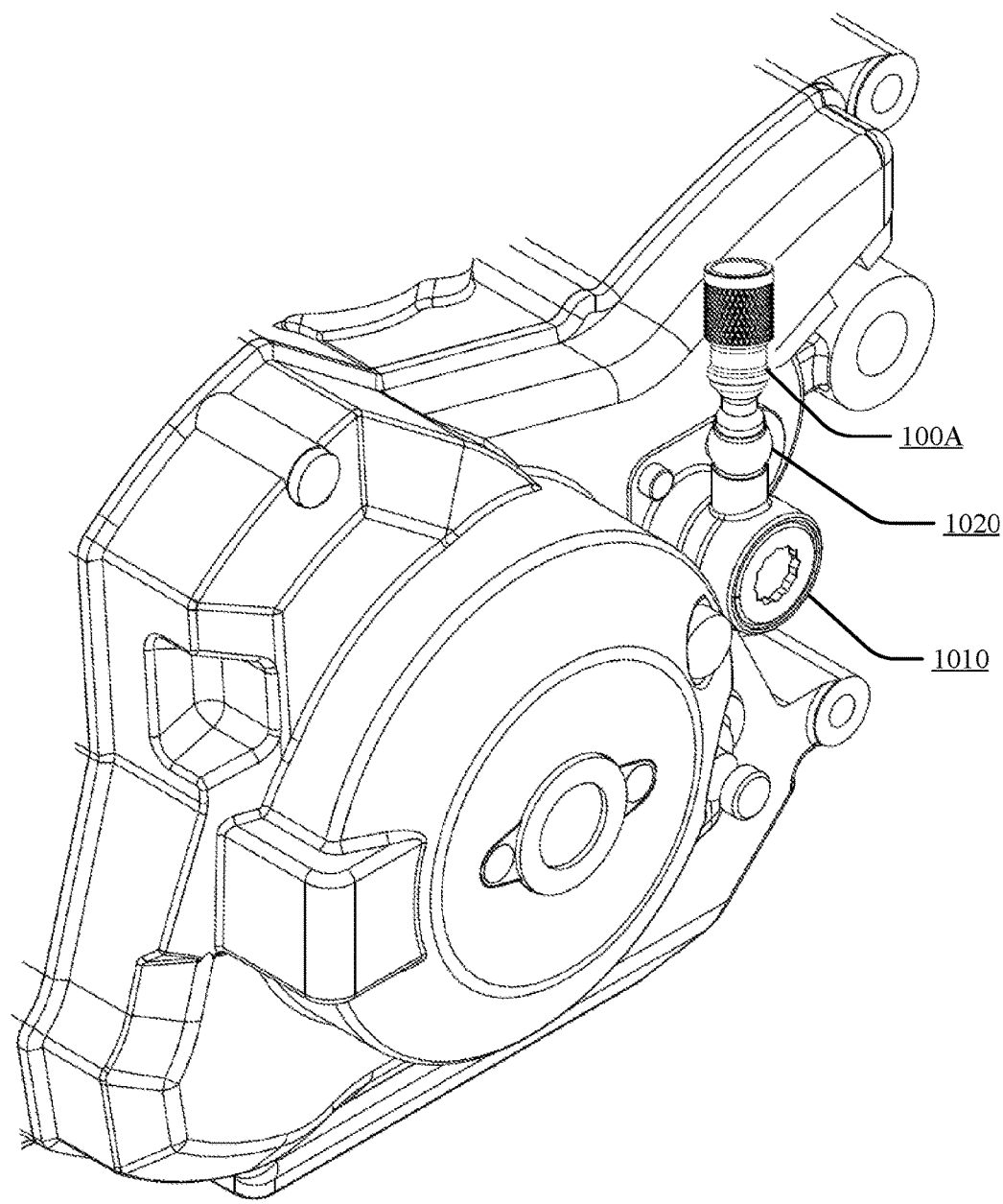
FIG. 10 illustrates a non-limiting diagram depicting an oil fill tube apparatus interlocked with a vehicle oil tank component in accordance with one or more embodiments described herein.

Turning now to FIG. 10, illustrated is a non-limiting diagram depicting an oil fill tube apparatus 100A interlocked with a vehicle oil tank component in accordance with one or more embodiments described herein. In an aspect, fill tube apparatus 100A can be interlocked with a vehicle oil tank component 1010 by interlocking with an oil tank opening 1020. In an aspect, the male external thread portion 140 can interlock with the female threading of oil tank opening 1020 of the vehicle oil tank component 1010. In an aspect, the interlocking mechanism between the vehicle oil tank component 1010 and the fill tube apparatus 100A can be via a screw mechanism (e.g., intertwining of complimentary threading). In another aspect, the fill tube apparatus 100A can act as an extension of the vehicle oil tank component 1010 where the inner funnel portion of the fill tube apparatus 100A smoothly and seamlessly transitions into the cavity of the vehicle oil tank component 1010.

Figure 11:
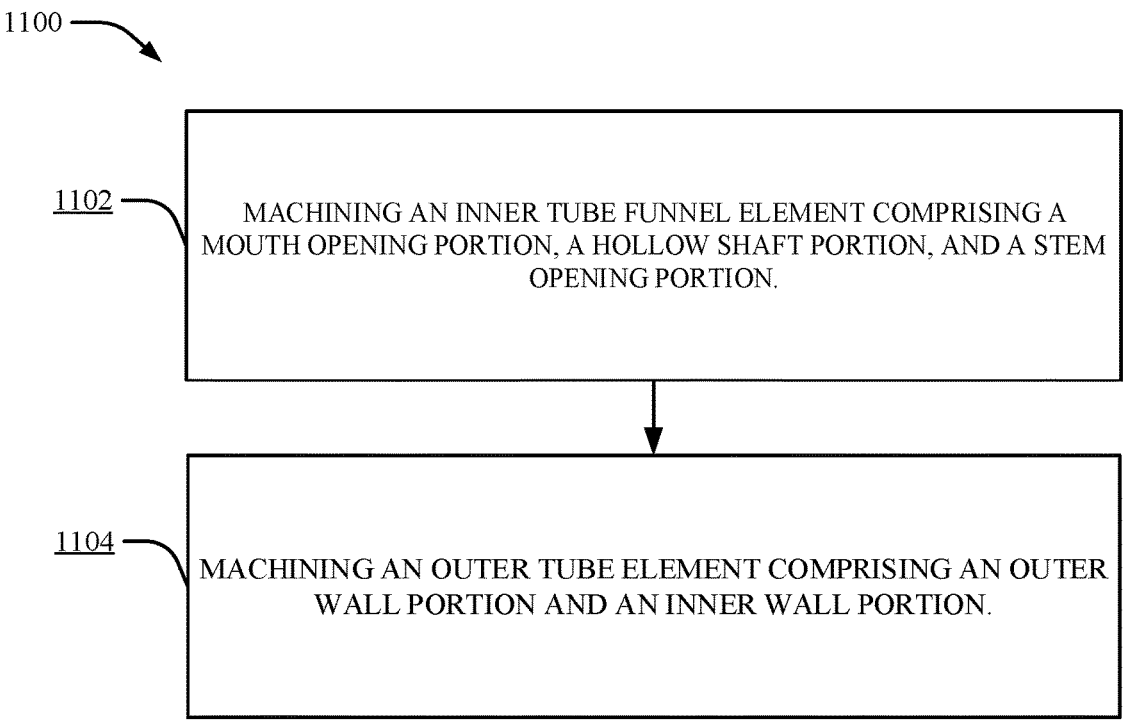
FIG. 11 illustrates a flow diagram of an example, non-limiting method for manufacturing an oil fill tube apparatus in accordance with one or more embodiments described herein.
Figure 12:
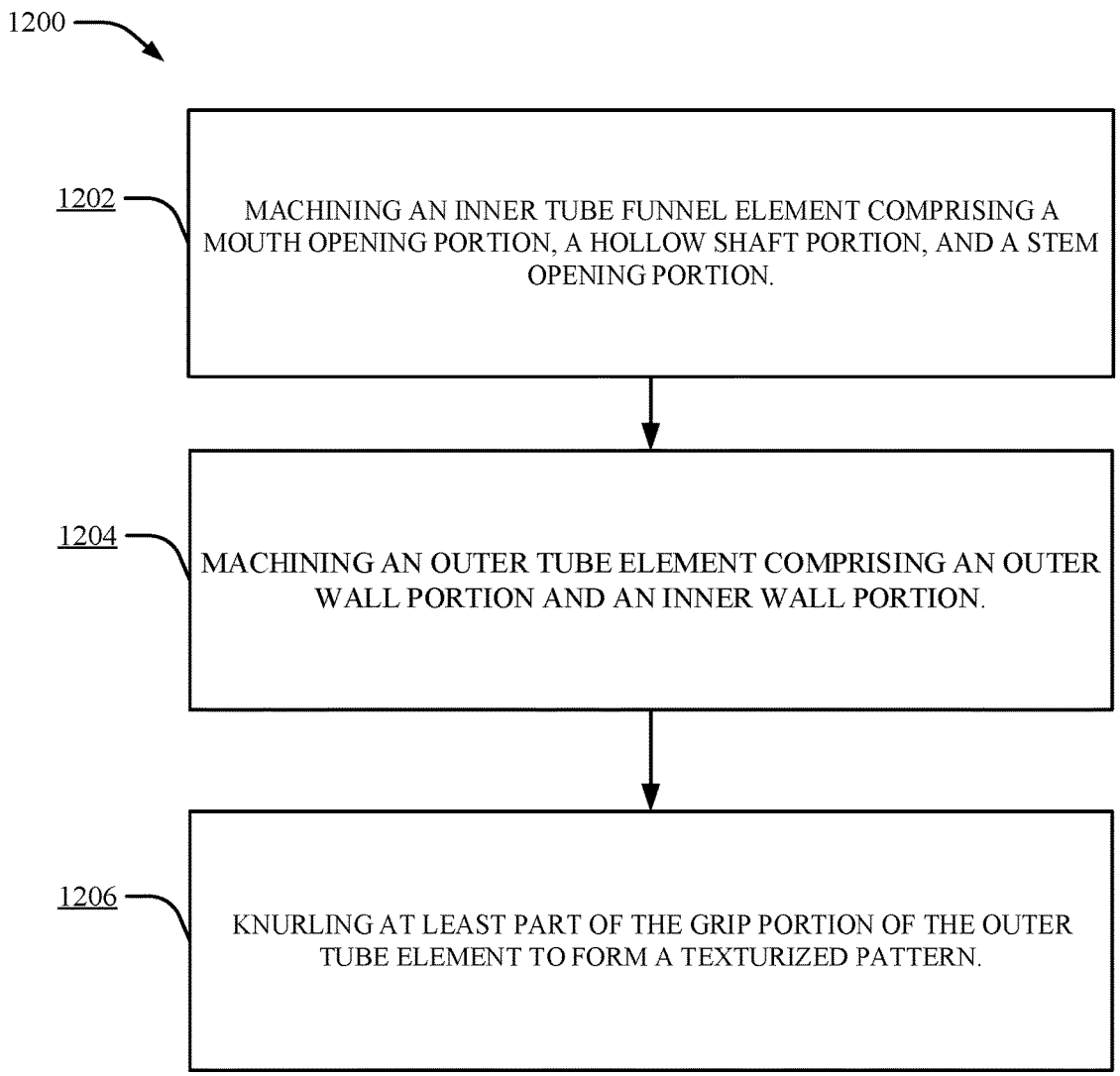
FIG. 12 illustrates a flow diagram of an example, non-limiting method for manufacturing an oil fill tube apparatus in accordance with one or more embodiments described herein.

FIGS. 11-12 illustrate various methodologies in accordance with certain embodiments of this disclosure. While, for purposes of simplicity of explanation, the methodologies are shown media a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being implemented by an apparatus as disclosed herein.

FIG. 11 provides an example method 1000 for manufacturing a fill tube apparatus in accordance with aspects and embodiments described herein. Repetitive description of like elements employed in system and methods disclosed herein is omitted for sake of brevity. At 1102, an inner tube funnel element comprising a mouth opening portion (e.g., mouth opening portion 210), a hollow shaft portion (e.g., hollow shaft portion 320), and a stem opening portion (e.g., stem opening portion 130) is machined. At 1104, an outer tube element comprising an outer wall portion and an inner wall portion is machined, wherein the outer wall portion comprises a base portion (e.g., base portion 102), a grip portion (e.g., a grip portion 104), a valley portion (e.g., valley portion 106), and a threaded stem portion (e.g., threaded stem portion 108).

In an aspect, a bar comprising a material (e.g., solid aluminum) can be carved to form sloped cylindrical portion 154 which can act as a ledge for the O-ring element 120 to sit upon. Furthermore, the carving can include a thread release carving that forms the major diameters (outer diameters) of the external threaded stem portion 108. In another aspect, a turning tool (e.g., turning tool with a sharp tip) can be employed to turn the bar (e.g., aluminum bar) and perform an outside preparation of the bar to a particular diameter (e.g., for instance, a 1.15-inch diameter). Furthermore, the outside preparation of the bar shines and prepares the outside diameter to a size that can allow the knurling process and pattern to properly be formed on the outside of the apparatus.

In another aspect, a knurling process can be performed on the outside of the apparatus to form grip portion 104. The knurling process can create a pattern forming the grip portion 104 such as a diamond pattern. In yet another aspect, a hold can be drilled within the solid metal bar (e.g., aluminum bar). Furthermore, in an aspect, a rough boring of the inside of the bar can be performed by a boring tool and the boring can whittle through the inside of the solid metal bar. In an aspect, the boring tool (e.g., machine operations executed by a processor and such operations or instructions stored within a memory) can cut out the center of the bar at a target revolution per minute (RPM), at a target depth of cut, at a target feed in inches per revolution to create the inner funnel area (e.g., hollow stem portion 360, hollow shaft portion 320, mouth opening 210, stem opening 130, etc.) of the apparatus. Furthermore, the boring tool can cut the inside of the metal bar at a target feed rate and target depth such that chipping metal do not form on the inside (e.g., get stuck or wedged internally) of the apparatus during the boring process.

For instance, a first target depth of cut can be made to hollow out the hollow shaft portion 320 and a second target depth of cut can be made to hollow out the hollow stem portion 360. Furthermore, to create the funneling aspect of the hollow shaft portion 320, the diameter drilled within this region can start larger and transition to smaller diameters as the drill approaches the hollow stem portion 360. In a non-limiting embodiment, the drill path can drill a 0.75-inch hole (e.g., or other sizes such as ⅞ inch or one-inch outer diameter drill hole) per pass and with each path the diameter can be enlarged with the diameter being smaller toward the stem opening 130 and larger toward the mouth opening 210. In another aspect, a finishing boring tool can be employed to bore a finishing path through the opening of the apparatus.

The finishing boring tool can smooth out the inside of the apparatus and machining coolant can be utilized to pour within the apparatus during the finishing boring stage such that the metal. In yet another aspect, a lathe tool can perform threading as per a canned cycle to form the threaded stem portion 108 of the apparatus. The process can include a turning over and over until the desired size of the threading is obtained. In an aspect, a G76 or a G92 caned cycle can be employed and can help form a desired size and cut of the threaded stem portion 108. Also, the speed at which threading takes place can be varied as well.

In yet another aspect, the boring of a bigger hole for the hollow shaft portion 320 and a smaller hold for the hollow stem portion 360 will create a disparity between the funnel portion and the stem portion thus leading to a greater angle being formed where both portions meet. As such, depending on the vehicle oil tank model for integration, the apparatus can vary with respect to thread size, thru hole size, angle between hollow stem portion 360 and hollow shaft portion 320, and other such variables. In an aspect, the thru hole (e.g., hole that eventually forms the hollow stem portion 360 and hollow shaft portion 320) can go through the center of the metal bar and create a hole size that grows 0.003 inches per revolution (e.g., every full rotational turn that the tool executes). In another aspect, a power brush tool can be used for the boring such that is spins and scratches away at the metal in the middle of apparatus. Furthermore, the power brush tool can smooth various regions of the inside of the apparatus (e.g., mouth opening 210) in order to blend regions into a smooth transitioned surface. Furthermore, the smoothing can create less friction between the liquid (e.g., oil) and the inner surface during contact between the two surfaces. Furthermore, the smooth surface creates a surface that is easier to clean within and on the outside of the apparatus.

In yet another embodiment, the fill tube apparatus can be manufactured using an injection molding manufacturing process. For instance, a material such as metal or plastic can be fed into a heated barrel with a cavity configured with the dimensions of the fill tube apparatus. As such the material can take the shape of the molding and form the fill tube apparatus. In another embodiment, surface coatings (e.g., anodization, chemical treatments, etc.) can be applied to the exterior of the fill tube apparatus to protect it from corrosion and/or apply colors or patterns to the exterior of the fill tube apparatus.

FIG. 12 provides an example method 1200 for manufacturing a fill tube apparatus in accordance with aspects and embodiments described herein. Repetitive description of like elements employed in system and methods disclosed herein is omitted for sake of brevity. At 1202, an inner tube funnel element comprising a mouth opening portion, a hollow shaft portion 320, and a stem opening portion is machined. At 1204, an outer tube element comprising an outer wall portion and an inner wall portion is machined, wherein the outer wall portion comprises a base portion, a grip portion, a valley portion, and a threaded stem portion. At 1206, at least part of the grip portion of the outer tube element is knurled to form a texturized pattern.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being implemented in connection with an apparatus disclosed herein.

What is claimed is:

1. A fill tube apparatus for a vehicle tank hindered by obstructive vehicle components, wherein the fill tube apparatus comprises:

an inner tube funnel element surrounded by an outer tube element, wherein, dimensions of the outer tube element and the inner tube element are configured to integrate with a vehicle tank that is at least partially obstructed by one or more vehicle component;

wherein the inner tube funnel element comprises an inner wall portion, a mouth opening portion, a hollow shaft portion, a hollow stem portion, and a stem opening portion,
  wherein the inner tube funnel element is configured with a hollow shaft portion connected to a hollow stem portion,
  wherein the hollow shaft portion comprises a mouth opening portion with a first diameter BC and a stem-funnel intersection portion with a second diameter WX that is shorter than the first diameter BC and any other diameter within the hollow shaft portion,
  wherein a decreasing diameter of the inner wall portion from the mouth opening portion to the stem-funnel intersection portion results in a gradual inward slope from the mouth opening portion to the hollow stem portion,
  wherein an angle of the gradual inward slope is configured to generate a continuous flow of liquids with varying viscosities that flow against the gradual inward slope based on a low resistance of the angle of the gradual inward slope;
  wherein the gradual inward slope seamlessly transitions into a stem inner wall portion WF that is perpendicular to the second diameter WX,
  wherein the stem inner wall portion WF has a stem length that extends from the stem funnel intersection to the stem opening portion,
  wherein the mouth opening portion is between 1 inch and 1.25 inch in diameter,
 wherein the outer tube element comprises an outer wall portion comprising a base portion, a grip portion, a valley portion, and a threaded stem portion,
  wherein the grip portion comprises a texturized imprint,
  wherein the texturized imprint is an angled diagonal line indented within the grip portion of the outer wall portion, wherein a direction of the angled diagonal line enhances a grip of the fill tube apparatus based on a user hand dominance,
  wherein the threaded stem portion comprises threaded grooves configured to interlock with a vehicle fill tank that is at least partially obstructed by one or more vehicle component,
 wherein an O-ring element mounted onto a horizontal flat surface of a fifth sloped cylindrical portion of the fill tube apparatus,
 wherein the O-ring element interfaces with a surface of the vehicle tank,
 wherein an interface between the O-ring element and the vehicle tank is a tight seal that inhibits seepage from the interface.

2. The fill tube apparatus of claim 1, wherein the grip portion further comprises a set of crossed line indentations representing a pattern that facilitates a stable grip of the fill tube apparatus.

3. The fill tube apparatus of claim 1, wherein the valley portion comprises a first sloped cylindrical portion, a second sloped cylindrical portion, a first straight cylindrical portion, a third sloped cylindrical portion, a fourth sloped cylindrical portion, a second straight cylindrical portion, and a fifth sloped cylindrical portion.

4. The fill tube apparatus of claim 1, wherein a first inside diameter of the stem opening portion is less than a second inside diameter of the hollow shaft portion, wherein the second inside diameter is less than a third inside diameter of the mouth opening portion, and wherein the first inside diameter of the stem opening portion is the same as a fourth inside diameter of the stem-funnel intersection portion.

5. The fill tube apparatus of claim 1, wherein a first thickness between the inner wall portion and the outer wall portion at the base portion is less than a second thickness between the inner wall portion and the outer wall portion at the grip portion, and wherein the first thickness and the second thickness are configured to enable the fill tube apparatus to fit within a confined area of a vehicle tank hindered by obstructive vehicle components.

6. The fill tube apparatus of claim 5, wherein the inner tube funnel element is a smooth surface capable of facilitating a transfer of oil into a containment portion.

7. The fill tube apparatus of claim 1, wherein the inner tube funnel element and the outer tube element comprise at least one of an aluminum material, a steel material, an iron material, or a copper material.

8. The fill tube apparatus of claim 1, wherein the O-ring element that rests on a first surface of a fifth sloped cylindrical portion and circumscribes one or more thread of an external thread portion of the threaded stem portion, and wherein the O-ring element is capable of sealing a linkage between the external thread portion and female thread portion of a vehicle tank opening that circumscribes a containment opening of a containment portion.

9. The fill tube apparatus of claim 8, further comprising the containment portion comprising the containment opening and the female thread portion circumscribing the containment opening, wherein the female thread portion is connected to the external thread portion.

10. An interlocked oil fill tube and oil storage tank assembly comprising:
 an inner tube funnel element comprising a mouth opening portion, a hollow shaft portion, and a stem opening portion, wherein the inner tube funnel element gradually slopes inward from the mouth opening to the hollow stem portion, and wherein the inner wall portion comprises a gradually angled inward slope that decreases resistance and increases a velocity of liquids of varying viscosities to continuously flow into a vehicle tank;
 an outer tube element comprising an outer wall portion and an inner wall portion, wherein the outer wall portion comprises a base portion, a grip portion, a valley portion, and a threaded stem portion, wherein the grip portion comprises a texturized imprint capable of facilitating a grip of the base portion, and wherein the grip portion is angled to satisfy grip requirements of a user hand dominance; and
 an O-ring element mounted onto a horizontal flat surface of a fifth sloped cylindrical portion of the fill tube apparatus, wherein the O-ring element interfaces with a surface of the vehicle tank, wherein an interface between the O-ring element and the vehicle tank is that inhibits seepage from the interface; wherein the vehicle tank is interlocked to the outer tube element via a linkage of the threaded stem portion to a female thread portion of the vehicle tank opening circumscribing an opening of the oil storage tank.

11. The interlocked oil fill tube and oil storage tank of claim 10, further comprising an internal cavity of the vehicle tank seamlessly connecting to an inner wall of the threaded stem portion.

12. The interlocked oil fill tube and oil storage tank assembly of claim 10, wherein the base portion further comprises a grip portion comprising a texturized imprint capable of facilitating a grip of the base portion.

* * * * *